United States Patent
Alfred et al.

(10) Patent No.: US 10,647,414 B2
(45) Date of Patent: May 12, 2020

(54) ROTORCRAFT FLY-BY-WIRE STANDARD RATE TURN

(71) Applicant: Textron Innovations Inc., Providence, RI (US)

(72) Inventors: Jillian Samantha Alfred, Ft. Worth, TX (US); Luke Dafydd Gillett, Grapevine, TX (US); Robert Earl Worsham, II, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 625 days.

(21) Appl. No.: 15/443,826

(22) Filed: Feb. 27, 2017

(65) Prior Publication Data
US 2018/0244369 A1   Aug. 30, 2018

(51) Int. Cl.
*B64C 13/50* (2006.01)
*G05D 1/08* (2006.01)
*F02C 9/44* (2006.01)
*G05D 1/00* (2006.01)

(52) U.S. Cl.
CPC ............. *B64C 13/503* (2013.01); *F02C 9/44* (2013.01); *G05D 1/0061* (2013.01); *G05D 1/0858* (2013.01)

(58) Field of Classification Search
CPC ......... B64C 13/503; B64C 13/18; F02C 9/44; G05D 1/0061; G05D 1/085; G05D 1/0858
USPC ............................................................ 701/3
See application file for complete search history.

(56) References Cited

U.S. PATENT DOCUMENTS

| | | | | |
|---|---|---|---|---|
| 2008/0097658 A1* | 4/2008 | Shue | ..................... | G05D 1/101 701/8 |
| 2010/0076625 A1* | 3/2010 | Yoeli | ..................... | B60V 1/043 701/4 |
| 2013/0060406 A1* | 3/2013 | Christensen | ......... | G05D 1/0858 701/4 |
| 2013/0090788 A1* | 4/2013 | Christensen | ......... | G05D 1/0858 701/4 |
| 2013/0138270 A1* | 5/2013 | Christensen | ........... | G05D 1/102 701/3 |
| 2013/0325221 A1* | 12/2013 | Shue | ..................... | G05D 1/0858 701/16 |
| 2014/0088800 A1* | 3/2014 | Mercer | .................. | B64D 43/02 701/14 |

(Continued)

FOREIGN PATENT DOCUMENTS

| | | |
|---|---|---|
| WO | 9305461 | 3/1993 |
| WO | 2012134447 A2 | 10/2012 |

*Primary Examiner* — Krishnan Ramesh
(74) *Attorney, Agent, or Firm* — Slater Matsil, LLP

(57) ABSTRACT

A fly-by-wire system for a rotorcraft includes a computing device having control laws. The control laws are operable to engage a roll command or a yaw command in response to deflection of a beep switch of a pilot control assembly, wherein a roll angle for the roll command or a yaw rate for the yaw command is determined based on forward airspeed of the rotorcraft. The beep switch may be disposed on a collective control of the pilot control assembly. The control laws are further operable to disengage the roll command or the yaw command in response to the beep switch being returned from a deflected position to a neutral position. In representative aspects, the roll angle or the yaw rate may correspond to a standard rate turn (e.g., 3° per second).

20 Claims, 13 Drawing Sheets

(56) References Cited

U.S. PATENT DOCUMENTS

2015/0375851 A1* 12/2015 Salesse-Lavergne .......................
G05D 1/0858
244/17.13
2016/0052626 A1* 2/2016 Vander Mey ........... B64C 27/02
244/17.11

* cited by examiner

FIG. 10
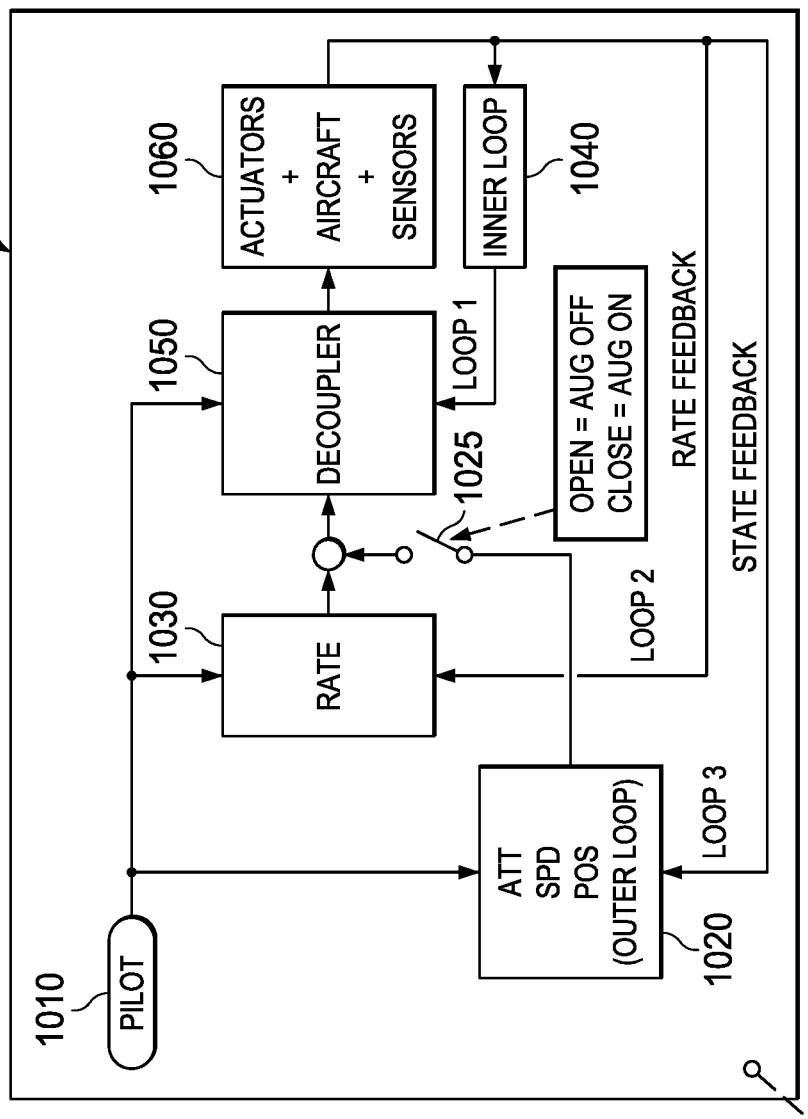
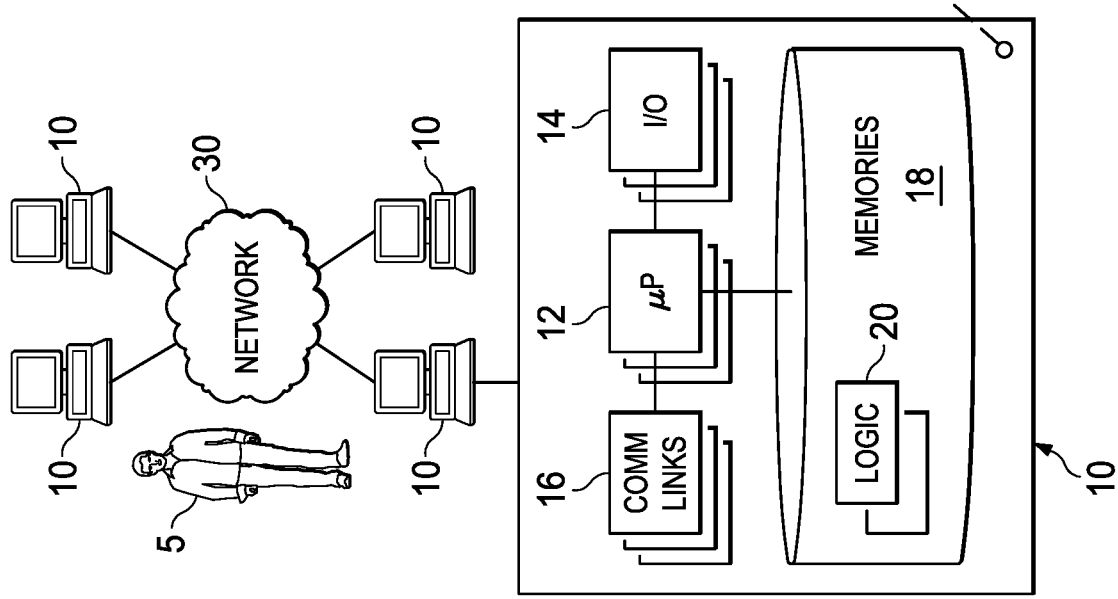

ROTORCRAFT FLY-BY-WIRE STANDARD RATE TURN

TECHNICAL FIELD

The present disclosure generally relates to aircraft flight control systems, and more particularly, to rotorcraft fly-by-wire (FBW) control laws.

BACKGROUND

A rotorcraft may include one or more rotor systems. Examples of rotor systems include main rotor systems and tail rotor systems. A main rotor system may generate aerodynamic lift to support the weight of the rotorcraft in flight, and thrust to counteract aerodynamic drag and to move the rotorcraft in forward flight. A tail rotor system may generate thrust in correspondence to the main rotor system's rotation in order to counter torque created by the main rotor system.

SUMMARY

A system of one or more computing devices can be configured to perform particular operations or actions by virtue of having software, firmware, hardware (or a combination thereof) installed on the system that in operation cause or causes the system to perform actions. One or more computer programs can be configured to perform particular operations or actions by virtue of including instructions that, when executed by data processing apparatuses, cause an apparatus to perform the actions.

One general aspect relates to a rotorcraft fly-by-wire (FBW) system that includes a flight control computer (FCC) having one or more control laws. At least one control law is operable to engage a roll command or a yaw command in response to deflection of a beep switch of a pilot control assembly (PCA), where a roll angle for the roll command or a yaw rate for the yaw command is based on forward airspeed. Other embodiments of this aspect include corresponding computer systems, apparatuses, and computer programs recorded on one or more computer storage devices, each configured to perform actions of the methods.

A representative aspect includes a method having a step of operating a rotorcraft in a first operating condition of a flight control system (FCS). An FCC of the rotorcraft is in electrical communication between the FCS and a PCA. The method also includes a step of the FCC receiving a pilot command to engage a turn rate based on pilot movement of a beep switch of the PCA from a neutral position to a deflected position. In response to the pilot command to engage the turn rate, the FCC transitions to a second operating condition, where the second operating condition includes one of a roll or a yaw in correspondence to the turn rate. Other embodiments of this aspect include corresponding computer systems, apparatuses, and computer programs recorded on one or more computer storage devices, each configured to perform actions of the methods.

Another representative aspect includes a rotorcraft having a power train coupled to a body. The power train has a power source and a drive shaft coupled to the power source. The rotorcraft includes a rotor system coupled to the power train and also includes a plurality of rotor blades. It will be noted, however, that various rotorcraft embodiments may or may not include tail rotor blades (e.g., NOTAR embodiments). An FCS of the rotorcraft is operable to change at least one operating condition of the rotor system. A PCA of the rotorcraft is configured to receive commands from a pilot. The FCS is in electrical communication with the PCA. The FCC is in electrical communication with and interposed between the FCS and the PCA. The FCC is configured to receive (e.g., from a beep switch of the PCA) a pilot command to engage a turn rate. In response to the pilot command to engage the turn rate, the FCC is configured to transition to a second operating condition of the rotor system, where the second operating condition of the rotor system includes one of a roll or a yaw corresponding to the turn rate. Other embodiments of this aspect include corresponding computer systems, apparatuses, and computer programs recorded on one or more computer storage devices, each configured to perform actions of the methods.

Representative embodiments of the present disclosure may provide one or more technical advantages. A technical advantage of one embodiment may include a capability to improve pilot control of a rotorcraft and reduce pilot workload. Another technical advantage of an embodiment may include a capability to decouple rotorcraft motions corresponding to different flight characteristics in order to turn a rotorcraft at a desired rate with reduced pilot workload. Yet another technical advantage of an embodiment may include a capability to manipulate a beep switch of a collective control to instruct a fly-by-wire system to engage a standard rate turn (e.g., 3° per second) with minimal, or otherwise reduced, input from a pilot.

Certain embodiments may include some, all, or none of the above advantages. One or more other technical advantages may be readily apparent to those skilled in the art upon review of the Figures, descriptions, and claims included herein.

BRIEF DESCRIPTION OF THE DRAWINGS

Representative aspects of the present disclosure may be understood from the following detailed description when read in conjunction with the accompanying Figures. It is noted that, in accordance with standard practice in the industry, various features may not be drawn to scale. For example, dimensions of various features may be arbitrarily increased or reduced for clarity of illustration or discussion. Corresponding numerals and symbols in different Figures generally refer to corresponding parts, unless otherwise indicated.

FIG. 10 representatively illustrates a three-loop flight control system in accordance with an embodiment.

DETAILED DESCRIPTION

Representative embodiments are discussed in detail below. It should be appreciated, however, that concepts disclosed herein may be embodied in a variety of contexts, and that specific embodiments discussed herein are merely illustrative and are not intended to limit the scope of the claims. Furthermore, it should be understood that various changes, substitutions, and alterations can be made herein without departing from the spirit and scope as defined by the appended claims.

Figure 1:
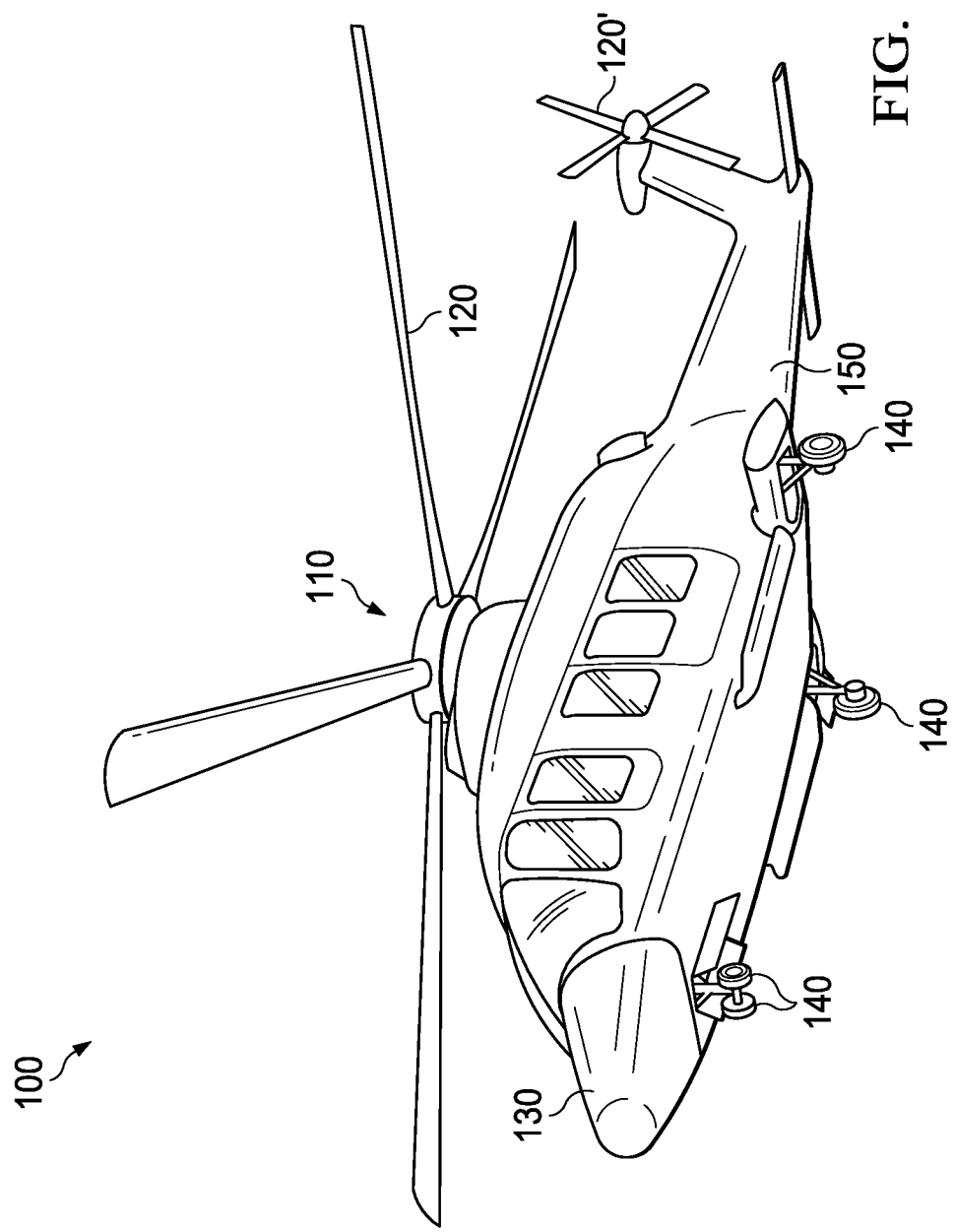
FIG. 1 representatively illustrates a rotorcraft in accordance with an embodiment.

FIG. 1 illustrates a rotorcraft 100 according to a representative embodiment. Rotorcraft 100 includes rotor system 110, main rotor blades 120, fuselage 130, landing gear 140, and tail boom 150. Rotor system 110 may rotate main rotor blades 120. Rotor system 110 may include a control system for selectively controlling pitch of each blade 120 in order to selectively control direction, thrust, and lift of rotorcraft 100. Fuselage 130 comprises the body of rotorcraft 100 and may be coupled to rotor system 110 such that rotor system 110 and main rotor blades 120 move fuselage 130 through the air in flight. Landing gear 140 support rotorcraft 100 during landing or when rotorcraft 100 is at rest on the ground. Tail boom 150 represents the rear section of rotorcraft 100 and has components of rotor system 110 and tail rotor blades 120'. Tail rotor blades 120' counter torque effect created by rotor system 110 and main rotor blades 120. Teachings of certain embodiments relating to rotor systems described herein may apply to rotor system 110 or other rotor systems, such as other tilt rotor or helicopter rotor systems. It should also be appreciated that representative embodiments of rotorcraft 100 may apply to aircraft other than rotorcraft, such as airplanes and unmanned aircraft, or the like.

A pilot may manipulate one or more pilot flight controls in order to achieve controlled aerodynamic flight. Inputs provided by the pilot to the pilot flight controls may be transmitted mechanically or electronically (for example, via a fly-by-wire flight control system) to flight control devices. Flight control devices may include devices operable to change flight characteristics of the aircraft. Representative flight control devices may include a control system operable to change a configuration of main rotor blades 120 or tail rotor blades 120'.

Figure 2:
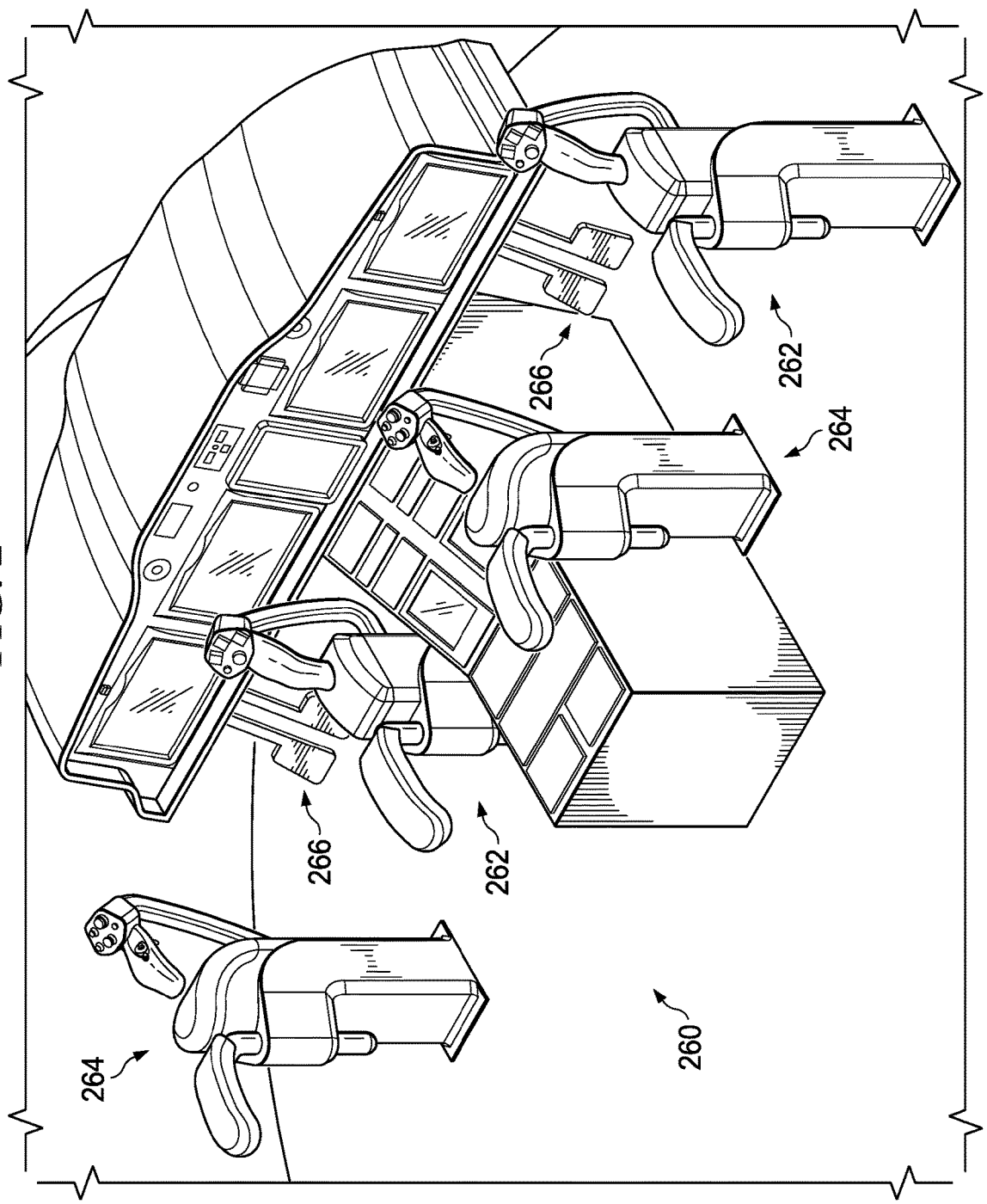
FIG. 2 representatively illustrates a cockpit configuration in accordance with an embodiment.

FIG. 2 illustrates a cockpit configuration 260 of rotorcraft 100 according to a representative embodiment. Rotorcraft 100 may include, e.g., three sets of pilot flight controls (e.g., cyclic control assemblies 262, collective control assemblies 264, and pedal assemblies 266). In accordance with a representative embodiment, a set comprising each different pilot flight control assembly is provided for a pilot and a co-pilot (both of which may be referred to as a "pilot" for purposes of discussion herein).

In general, cyclic pilot flight controls may allow a pilot to impart cyclic configurations to main rotor blades 120. Varied cyclic configurations of main rotor blades 120 may cause rotorcraft 100 to tilt in a direction specified by the pilot. For tilting forward and back (pitch) or tilting sideways (roll), the angle of attack of main rotor blades 120 may be altered with cyclic periodicity during rotation of rotor system 110, creating variable amounts of lift at varied points in the rotation cycle. Alteration of cyclic configuration of main rotor blades 120 may be accomplished by input from cyclic control assembly 262.

Collective pilot flight controls may allow a pilot to impart collective configurations to main rotor blades 120. Collective configurations of main rotor blades 120 may change overall lift produced by main rotor blades 120. For increasing or decreasing overall lift in main rotor blades 120, the angle of attack for all main rotor blades 120 may be collectively altered by equal amounts and at the same time, resulting in ascent, descent, acceleration, and deceleration. Alteration of collective configuration of main rotor blades 120 may be accomplished by input from collective control assembly 264.

Anti-torque pilot flight controls may allow a pilot to change the amount of anti-torque force applied to rotorcraft 100. Tail rotor blades 120' may operate to counter torque created by rotor system 110 and main rotor blades 120. Anti-torque pilot flight controls may change the amount of anti-torque force applied to change a heading of rotorcraft 100. For example, providing anti-torque force greater than the torque effect created by rotor system 110 and main rotor blades 120 may cause rotorcraft 100 to rotate in a first direction, whereas providing anti-torque force less than the torque effect created by rotor system 110 and main rotor blades 120 may cause rotorcraft 100 to rotate in a second direction opposite the first direction. In some embodiments, anti-torque pilot flight controls may change the amount of anti-torque force applied by changing the pitch of tail rotor blades 120', thereby increasing or reducing thrust produced by tail rotor blades 120' and causing the nose of rotorcraft 100 to yaw in a direction corresponding to application of input from pedal assembly 266.

In other embodiments, rotorcraft 100 may include additional or different anti-torque devices, such as a rudder or a no-tail-rotor (NOTAR) anti-torque device. Conjunctive or alternative anti-torque embodiments may be operable to change an amount of anti-torque force provided by such additional or different anti-torque device.

In some embodiments, cyclic control assembly 262, collective control assembly 264, and pedal assemblies 266 may be used in a fly-by-wire (FBW) flight control system. In an example representatively illustrated in FIG. 2, each cyclic control assembly 262 is located to the right of a pilot seat, each collective control assembly 264 is located to the left of a pilot seat, and each pedal assembly 266 is located in front of a pilot seat. In other embodiments, cyclic control assemblies 262, collective control assemblies 264, and pedal assemblies 266 may be located in any suitable location of a cockpit configuration.

In some embodiments, cyclic control assembly 262, collective control assembly 264, and pedal assemblies 266 may be in mechanical communication with trim assemblies that convert mechanical inputs into FBW flight control commands. These trim assemblies may include, among other items, measurement devices for measuring mechanical inputs (e.g., measuring or otherwise determining input position) and trim motors for back-driving center positions of the cyclic control assembly 262, collective control assembly 264, or pedal assemblies 266.

Figure 3:
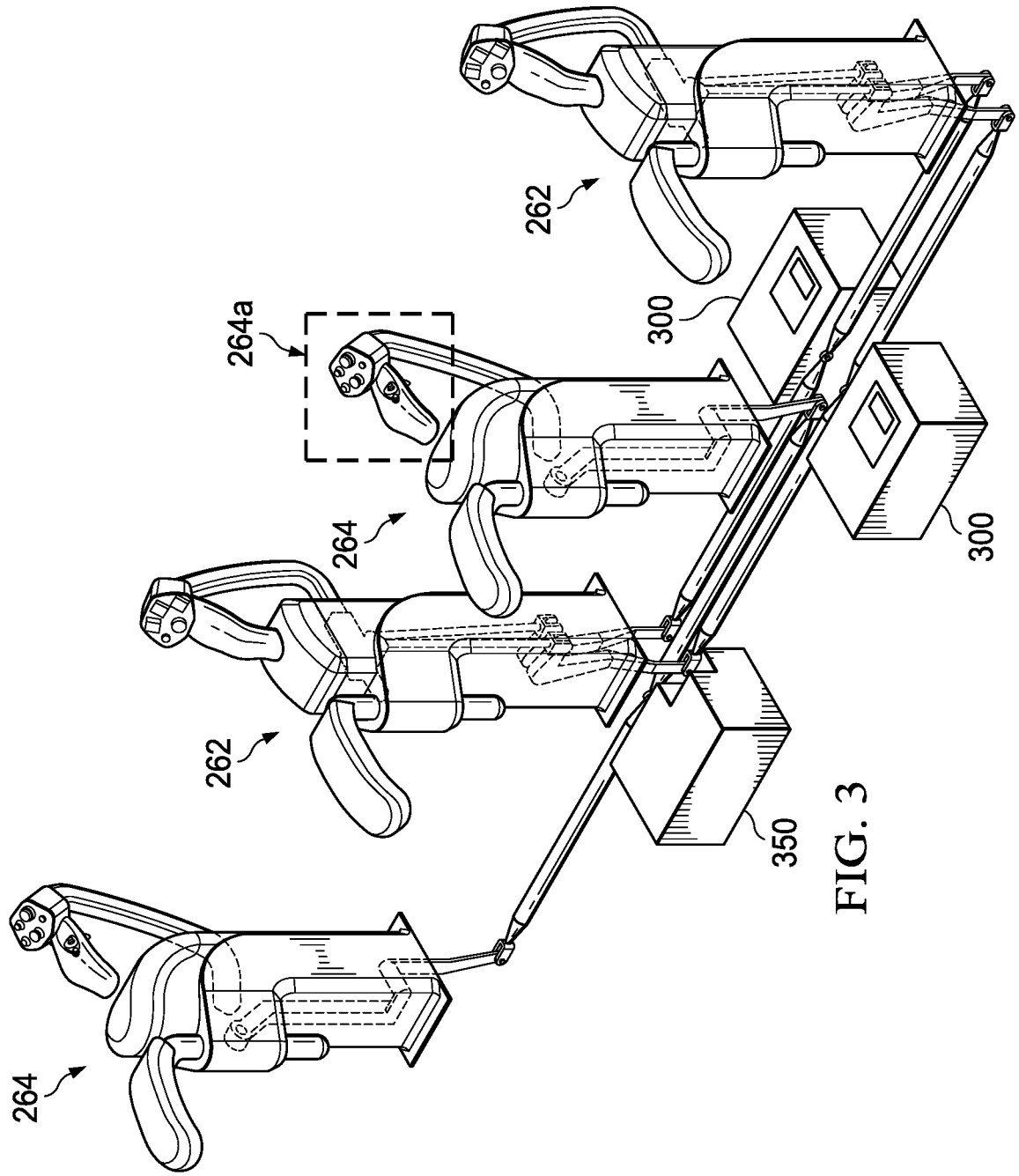
FIG. 3 representatively illustrates an installation of cyclic control assemblies and collective control assemblies in accordance with an embodiment.

For example, FIG. 3 representatively illustrates an installation of two cyclic control assemblies 262 and two collective control assemblies 264 according to an embodiment. In this example, the cyclic control assemblies 262 and collective control assemblies 264 are coupled to three integrated trim assemblies: two cyclic trim assemblies 300 and a collective trim assembly 350. One of the cyclic trim assemblies 300 manages left/right cyclic tilting movements (e.g., roll) and the other cyclic trim assembly 300 manages front/back cyclic tilting movements (e.g., pitch).

Cyclic trim assemblies 300 and collective trim assembly 350 are operable to receive and measure mechanical communications of cyclic and collective motions from a pilot. In a representative aspect, cyclic trim assemblies 300 and collective trim assembly 350 may embody components of a FBW flight control system, and measurements from cyclic trim assemblies 300 and collective trim assembly 350 may be sent to a flight control computer (FCC) operable to instruct rotor system 110 to change a position of main rotor blades 120 based on received or otherwise determined measurements. For example, the FCC may be in communication with actuators or other devices operable to change the position of main rotor blades 120.

Figure 4:
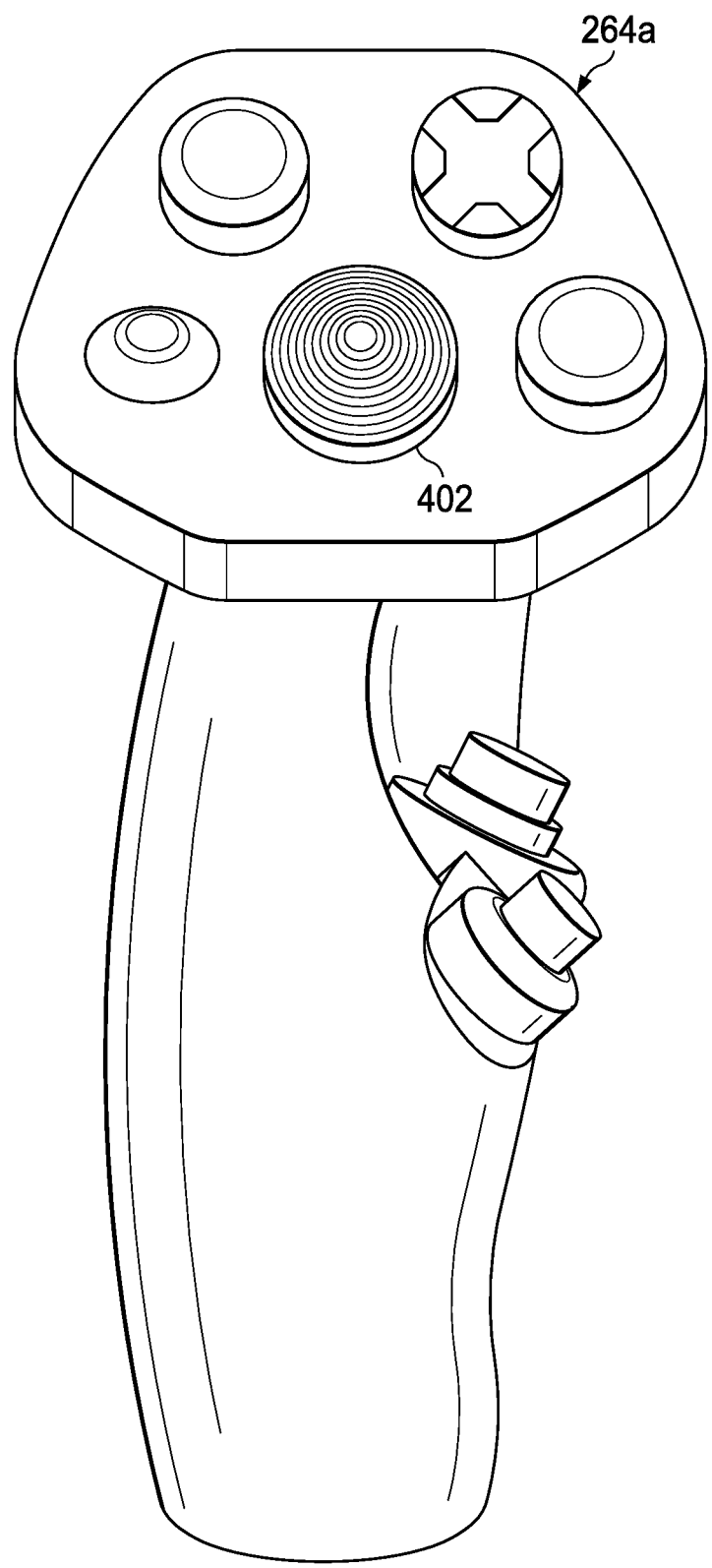
FIG. 4 representatively illustrates a grip portion of a collective control assembly in accordance with an embodiment.

As representatively illustrated in FIG. 3 and FIG. 4, collective control assemblies 264 may include a collective control grip 264a having a beep switch 402 (also termed "pedal beep" or "beep button") disposed thereon. Up/down manipulation of beep switch 402 may be used to adjust collective position of rotor system 110. In representative fly-by-wire embodiments disclosed herein, beep switch 402 may be configured with alternative or additional function for left/right manipulation. In a representative aspect, beep switch 402 may be configured to engage a standard rate turn (e.g., 3° per second) of rotorcraft 100 when beep switch 402 is displaced away from a neutral position toward a deflected position. If the deflected position is laterally toward the left-hand side of rotorcraft 100, then rotorcraft 100 may be instructed by the FCC to turn left. If the deflected position is laterally toward the right-hand side of rotorcraft 100, then rotorcraft 100 may be instructed by the FCC to turn right. Beep switch 402 may: be deflected within a plane along an x-axis and along a y-axis; simultaneously have non-zero deflection values for both the x-axis and the y-axis; and be configured to return to a center-x/center-y neutral location when the pilot removes manipulative force from, or is no longer in contact with, beep switch 402. In this sense, beep switch 402 operates in similar fashion and function as a binary joystick.

Figure 5:
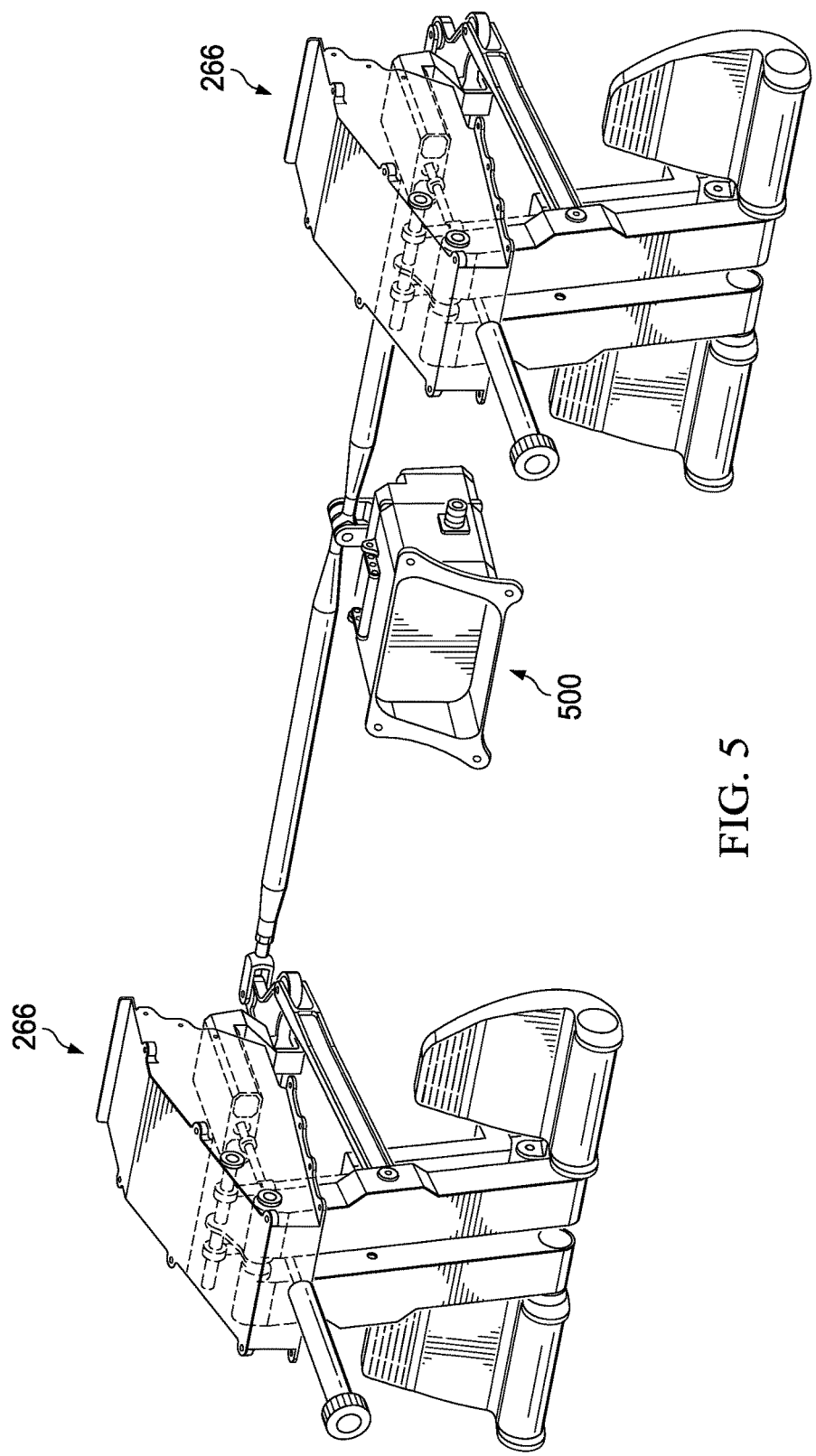
FIG. 5 representatively illustrates an installation of pedal assemblies in accordance with an embodiment.

FIG. 5 representatively illustrates an installation of pedal assemblies 266 in accordance with an embodiment. Two pedal assemblies 266 are coupled to an anti-torque trim assembly 500. Pedal linkages are in mechanical communication, e.g., via a rocker arm and pedal adjustment linkages. The rocker arm is operable to rotate about a point of rotation such that pushing in one pedal causes the pedal adjustment linkage to rotate the rocker arm, which in turn causes the pedal adjustment linkage to push out the other pedal in an opposite direction.

Rotating the rocker arm also causes a trim linkage to reposition a mechanical input associated with anti-torque trim assembly 500. In this manner, the pilot can mechanically communicate anti-torque commands to anti-torque trim assembly 500 by moving the pedals. Furthermore, trim linkages couple adjacent pedal assemblies 266 together such that pilot pedals and co-pilot pedals are in mechanical communication.

Figure 6:
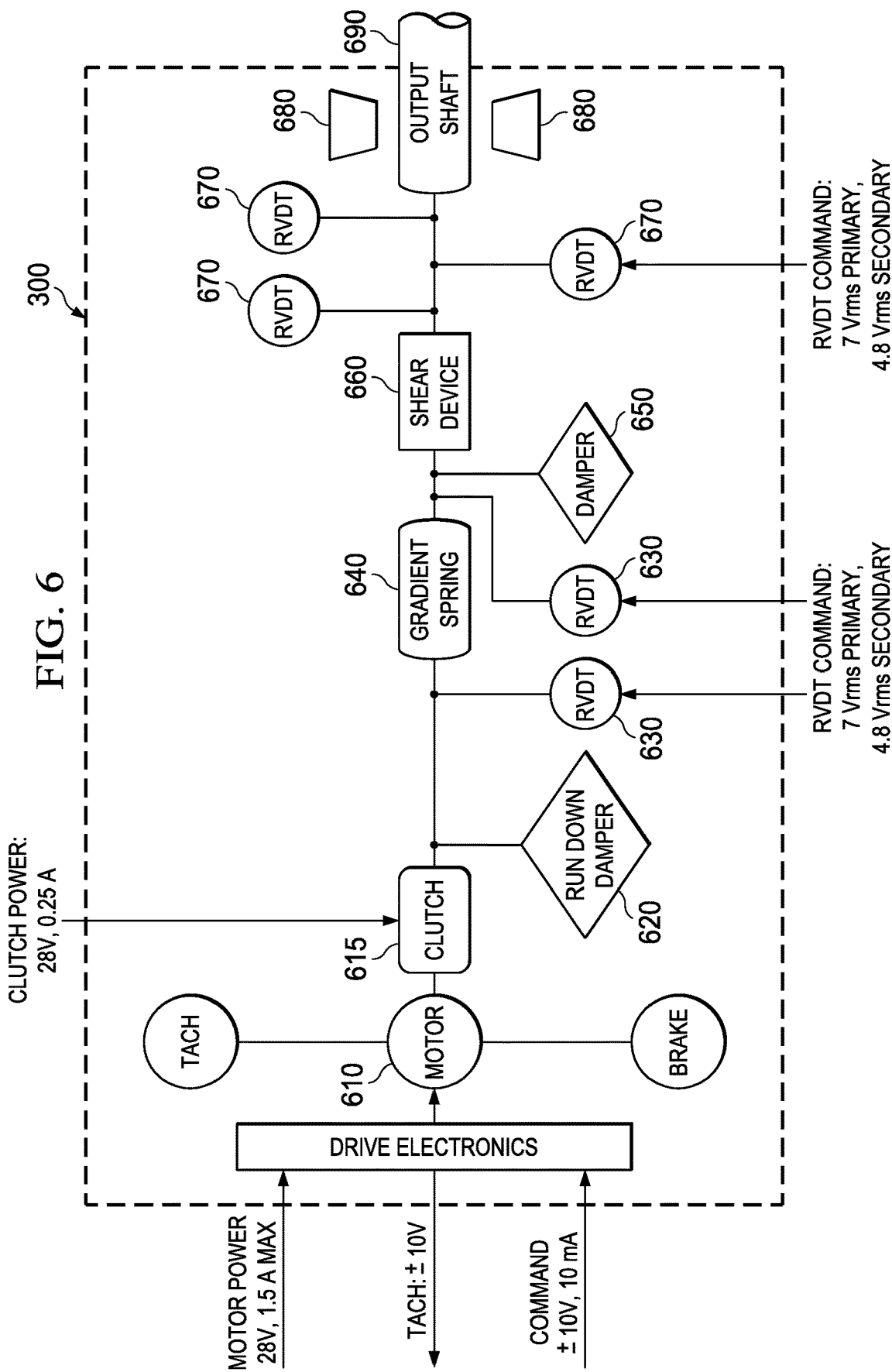
FIG. 6 representatively illustrates a cyclic trim assembly in accordance with an embodiment.
Figure 7:
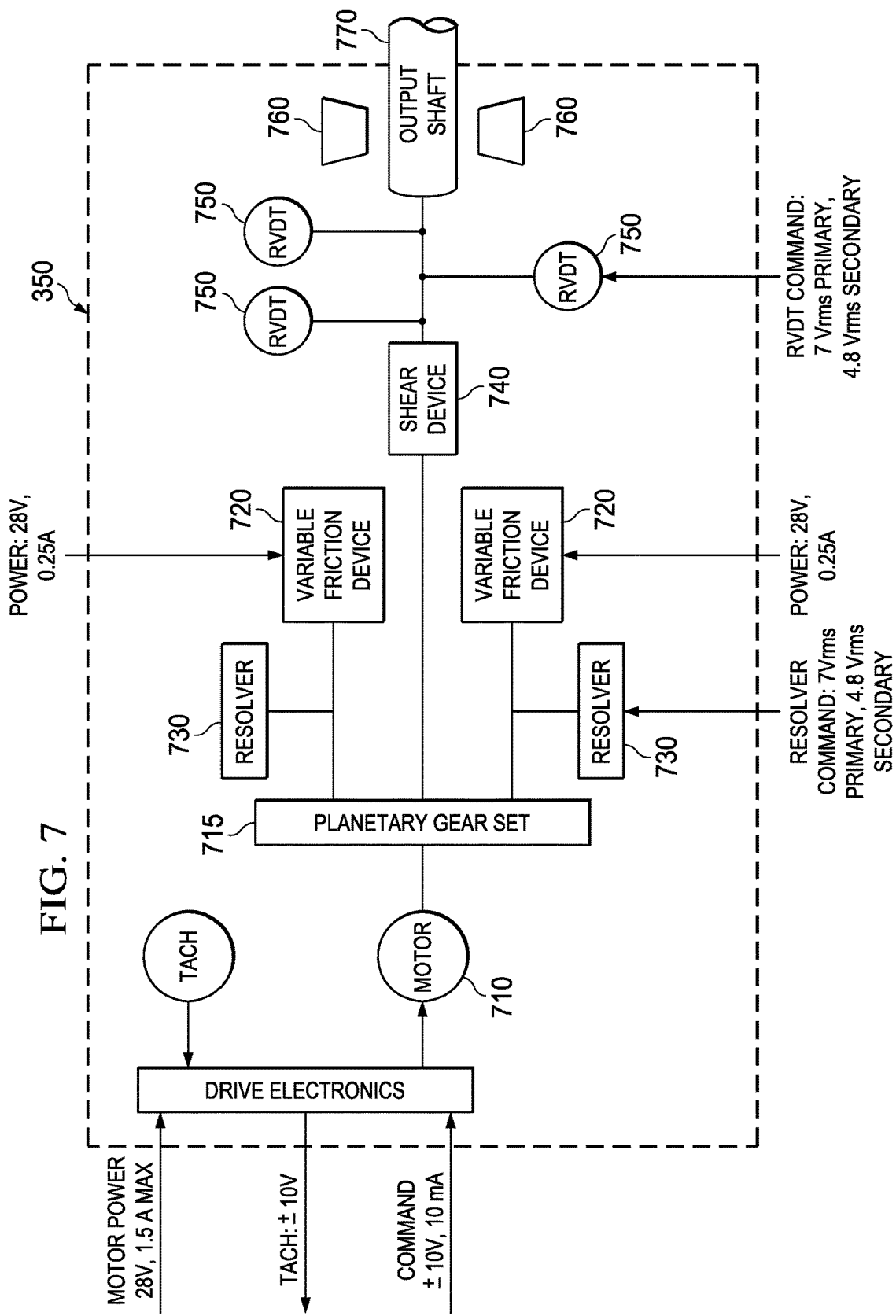
FIG. 7 representatively illustrates a collective trim assembly in accordance with an embodiment.
Figure 8:
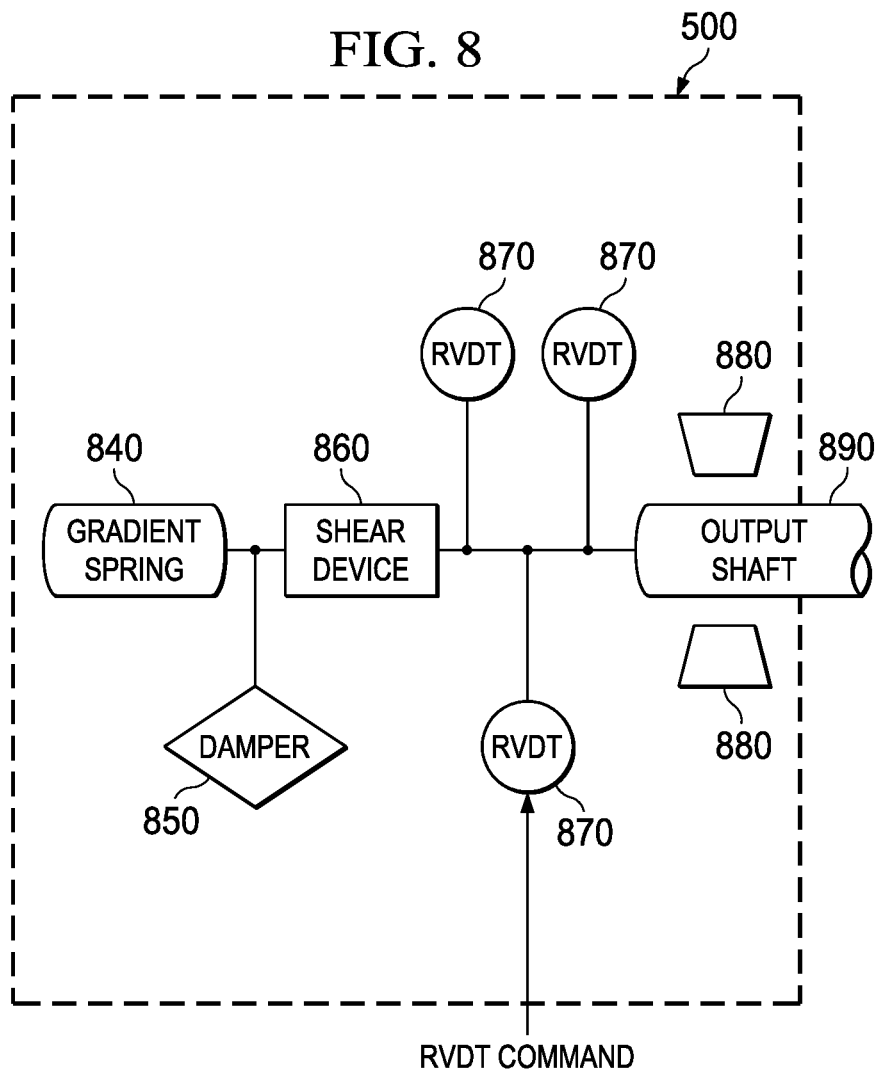
FIG. 8 representatively illustrates an anti-torque trim assembly in accordance with an embodiment.

FIG. 6, FIG. 7, and FIG. 8 show the trim assemblies (300, 350, 500) of FIG. 3 and FIG. 5 according to a representative embodiment. FIG. 6 shows cyclic trim assembly 300 according to an embodiment, FIG. 7 shows collective trim assembly 350 according to an embodiment, and FIG. 8 shows anti-torque trim assembly 500 according to an embodiment.

FIG. 6 representatively illustrates an embodiment of cyclic trim assembly 300 having a trim motor 610, a clutch 615, a run-down damper 620, position measurement devices 630, a gradient spring 640, a damper 650, a shear device 660, position measurement devices 670, mechanical stop devices 680, and an output shaft 690. Although output shaft 690 may be described as a single shaft, it will be appreciated that output shaft 690 may have multiple components. For example, output shaft 690 may include two shafts separated by gradient spring 640. In another example, output shaft 690 may have a single shaft with a torsion spring attached thereto.

In operation according to an embodiment, output shaft 690 and cyclic control assemblies 262 are in mechanical communication such that movement of grip (630) results in movement of output shaft 690, and movement of output shaft 690 likewise results in movement of grip (630). Movement of output shaft 690 may be measured or otherwise determined by position measurement devices 630 and 270. The measurements from measurement devices 630 and 270 may be used to instruct rotor system 110 to change the position of main rotor blades 120.

Cyclic trim assembly 300 may operate in three modes of operation. In a first mode of operation, clutch 615 is engaged and trim motor 610 drives output shaft 690. This first mode of operation may represent, for example, operation of cyclic trim assembly 300 during auto-pilot operations. In this example, trim motor 610 may drive movement of output shaft 690 so as to drive movement of grip (630) of cyclic control assembly 262. Position measurement devices 630 and 270 may also measure how trim motor 610 drives output shaft 690 and communicate these measurements to rotor system 110.

In a second mode of operation, clutch 615 is disengaged and the pilot drives output shaft 690 by way of cyclic control assembly 262. In this example, the pilot changes the position of output shaft 690, which may be measured by position measurement devices 630 and 270. Position measurement devices 630 and 270 may measure how the pilot drives output shaft 690 and communicate these measurements to rotor system 110.

In a third mode of operation, clutch 615 is engaged and trim motor 6100 holds its output arm at a trim position so as to provide a ground point for output shaft 690. In this example, the pilot may change the position of output shaft 6900 about the trim position set by trim motor 610. When the pilot releases grip (630), grip (630) may move to the trim position corresponding to the position established by trim motor 610. In some embodiments, the first and third modes of operations may be combined such that trim motor 610 moves the trim position during operation.

Thus, trim motor 610 may provide cyclic force or trim to cyclic control assembly 262 through output shaft 690. In an embodiment, trim motor 610 may be a 28 volt DC permanent magnet motor. In operation, trim motor 610 may provide an artificial-force feel (or "force feedback") for a flight control system (FCS) about an anchor point (or "detent"). Clutch 615 provides a mechanism for engaging and disengaging trim motor 610.

FIG. 7 shows an embodiment of collective trim assembly 350 having a trim motor 710, planetary gear set 715, variable friction devices 720, resolvers 730, a shear device 740, position measurement devices 750, mechanical stop devices 760, and an output shaft 770. Output shaft 770 may be coupled to various linkages. Although output shaft 770 may be described as a single shaft, it will be appreciated that output shaft 770 may comprise multiple components or pieces.

Output shaft 770 and collective control assemblies 264 are in mechanical communication such that movement of grip (730) results in movement of output shaft 770, and movement of output shaft 770 likewise results in movement of grip (730). Movement of output shaft 770 may be measured or otherwise determined by position measurement devices 750. Measurements from measurement devices 750 may be used to instruct rotor system 110, e.g., as to how to change the position of main rotor blades 120.

Collective trim assembly 350 may operate in three modes of operation. In a first mode of operation, variable friction devices 720 are engaged and trim motor 710 drives output shaft 770. This first mode of operation may represent, for example, operation of collective trim assembly 350 during auto-pilot operations. In this example, trim motor 710 may drive movement of output shaft 770 so as to drive movement of grip (730) of collective control assembly 264. Position measurement devices 750 may also measure how trim motor 710 drives output shaft 770 and communicate these measurements to rotor system 110.

In a second mode of operation, variable friction devices 720 are disengaged and the pilot drives output shaft 770 by way of collective control assembly 264. In this example, the pilot changes the position of output shaft 770, which may be measured or otherwise determined by position measurement devices 750. Position measurement devices 750 may measure or otherwise determine how the pilot drives output shaft 770 and communicate these measurements to rotor system 110.

In a third mode of operation, variable friction devices 720 are engaged, and trim motor 710 holds its output arm at a trim position so as to provide a ground point for output shaft 770. In this example, the pilot may change the position of output shaft 770 about the trim position set by trim motor 710. When the pilot releases grip (730), grip (730) may move to the trim position corresponding to the position established by trim motor 710. In some embodiments, the first and third modes of operations may be combined such that trim motor 710 moves the trim position during operation.

Thus, trim motor 710 may provide collective force or trim to collective control assembly 264 through output shaft 770. In one example embodiment, trim motor 710 may be a 28 volt DC permanent magnet motor. In operation, trim motor 710 may provide an artificial force feel for an FCS about an anchor point. Variable friction devices 720 provide a mechanism for engaging and disengaging trim motor 710.

FIG. 8 shows an embodiment of anti-torque trim assembly 500 featuring a gradient spring 840, a damper 850, a shear device 860, position measurement devices 870, mechanical stop devices 880, and an output shaft 890. Although output shaft 8900 may be described as a single shaft, it will be appreciated that output shaft 8900 may comprise multiple pieces or components.

In operation, according to an embodiment, output shaft 8900 and pedal assemblies 266 are in mechanical communication such that movement of the pedals results in movement of output shaft 890, and movement of output shaft 890 likewise results in movement of the pedals. Movement of output shaft 8900 may be measured or otherwise determined by position measurement devices 870. Measurements from measurement devices 870 may be used to instruct rotor system 110, e.g., as to how to change the position of tail rotor blades 120' (or how to change operation of an alternative anti-torque system).

Although cyclic control assembly 262, collective control assembly 264, and pedal assemblies 266 may generally control the cyclic, collective, and anti-torque movements of rotorcraft 100 (respectively), generally, aircraft dynamics may result in a coupling of aircraft motions (or flight characteristics). As an example, inputting a change in lateral cyclic into cyclic control assembly 262 may result in a change in the pitch moment of rotorcraft 100. This change in the pitch moment may occur even if no longitudinal cyclic input is provided to cyclic control assembly 262. Rather, this change in the pitch moment would be the result of aircraft dynamics. In such an example, a pilot may apply a counteracting longitudinal cyclic input to compensate for the change in pitch moment. Accordingly, coupling of aircraft flight characteristics generally increases pilot workload.

Different aircrafts may be associated with different couplings of aircraft motions. For example, a rotorcraft with a canted tail rotor may be associated with a high level of coupling due to the "lift" generated by the canted tail rotor combined with normal coupling of yaw motion to collective pitch and coupling of cyclic inputs of conventional single-rotor rotorcraft. In such an example, feedback loops may not be sufficient to compensate for this coupling because feedback loops do not engage until after the coupled response occurs.

Figure 9:
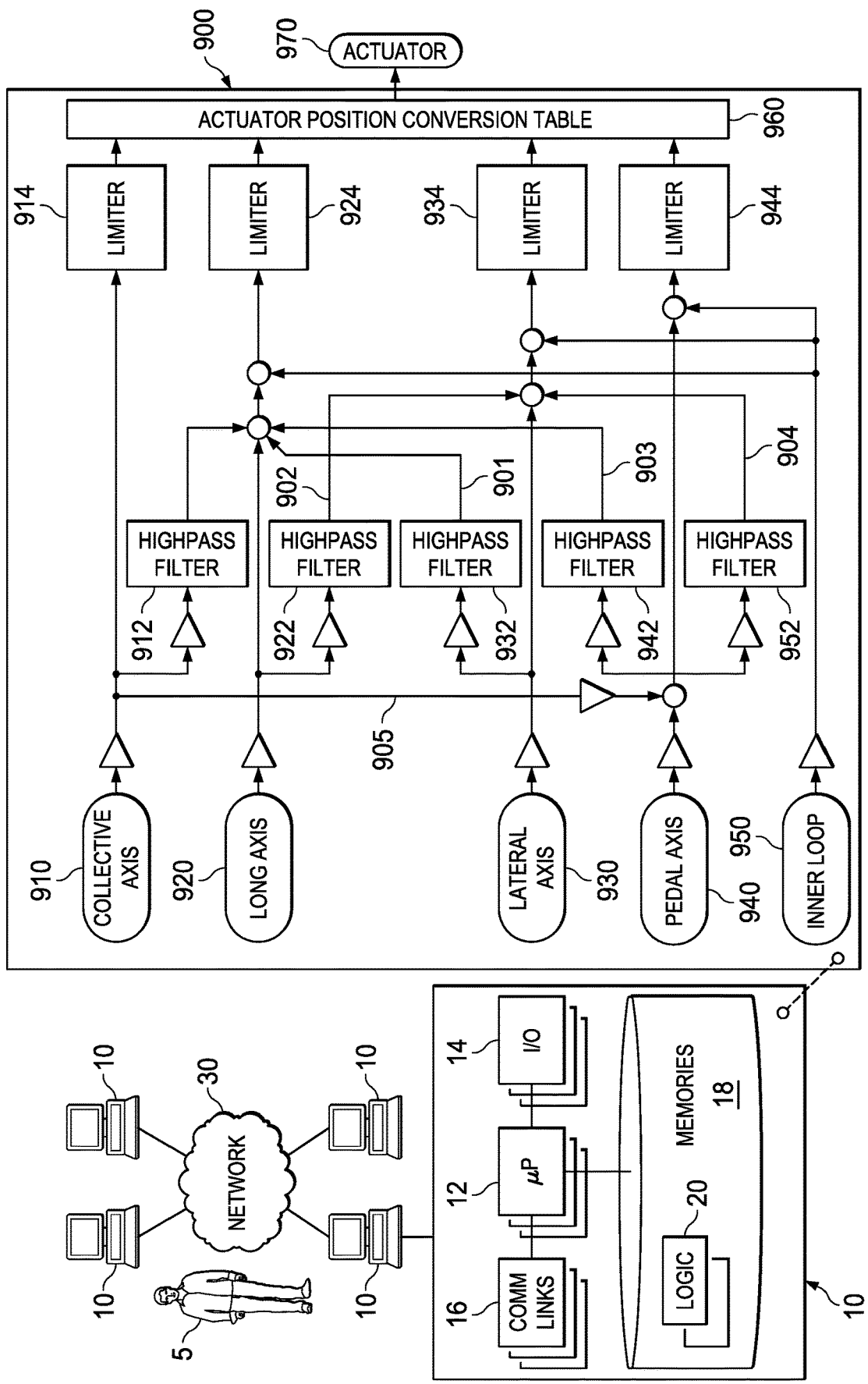
FIG. 9 representatively illustrates a cross-feed arrangement in accordance with and embodiment.

Accordingly, rotorcraft fly-by-wire systems described herein recognize the capability to augment flight control commands with feed-forward control cross-feeds that anticipate inherent coupling of aircraft motions. FIG. 9 shows a fly-by-wire cross-feed arrangement 900. As shown in FIG. 9, cross-feed arrangement 900 has five inputs: a collective axis input 910, a longitudinal cyclic axis input 920, a lateral cyclic axis input 930, a pedal axis input 940, and an inner loop input 950. Examples of inner loop input 950 will be discussed later with regard to FIG. 10.

As representatively illustrated in FIG. 9, each input may be cross-fed to a different axis. In some examples, high-pass filters (e.g., high-pass filters 912, 922, 932, 942, and 952) may be used to filter cross-feed signals by allowing high-frequency signals to pass, but attenuating frequencies lower than a cut-off frequency. Fixed gains are applied to the inputs before passing through the high-pass filters. The cross-feed signals may then be passed through a limiter (e.g., limiter 914, 924, 934, or 954) to an actuator position converter 960, which processes the signals and converts them into instructions for one or more actuators 970. Each actuator 970 may represent any device that provides flight control inputs to a flight control device. Examples of actuators 970 may include, but are not limited to, a swashplate actuator, a pitch-link actuator, an on-blade actuator, or the like.

The example of FIG. 9 has at least five representative cross-feeds. A first cross-feed 901 is a lateral cyclic to longitudinal cyclic cross-feed based on providing longitudinal cyclic to cancel the pitch moment generated by a change in lateral cyclic. A second cross-feed 902 is a longitudinal cyclic to lateral cyclic cross-feed based on providing lateral cyclic to cancel the roll moment generated by a change in longitudinal cyclic. A third cross-feed 903 is a pedal axis (tail rotor collective) to longitudinal cyclic cross-feed based on providing longitudinal cyclic to cancel the pitch moment of the tail rotor collective. A fourth cross-feed 904 is a tail rotor collective to lateral cyclic cross-feed based on providing lateral cyclic to cancel the roll moment of the tail rotor collective. A fifth cross-feed 905 is a main rotor collective to tail rotor collective cross-feed based on providing tail rotor collective to cancel the yaw moment of the main rotor collective.

Although FIG. 9 is representatively illustrated with five cross-feeds, more, fewer, or different cross-feeds may be utilized. In general, cross-feeds may be utilized whenever a pilot provides a command to change a first flight characteristic, where changing the first flight characteristic would result in an expected change to a second flight characteristic. The cross-feed may result in an instruction to change a first operating condition of the FCS in response to a received pilot command and an instruction to change a second operating condition in response to the expected change to the second flight characteristic. This second instruction could at least partially offset, counteract, or otherwise address the expected change to the second flight characteristic.

Representative embodiments appreciate that applying cross-feeds to "decouple" an aircraft having coupled flight dynamics may reduce pilot workload by automatically applying cross-feed commands without pilot intervention. For example, in some embodiments, applying decoupling cross-feeds may reduce or eliminate the need for the pilot to apply commands through the pilot controls that are intended to at least partially offset the coupled motion of the aircraft. In some circumstances, the FCS may apply cross-feed inputs faster than a pilot could manually. For example, the cross-feeds may anticipate (and therefore more quickly address) inherently coupled aircraft motion or flight characteristics.

Cyclic control assembly 262 may be configured to operate as a displacement-trim device such that movements of the longitudinal stick correlate to the position of the swashplate. In such an example, applying cross-feeds to anticipate inherent coupling of aircraft motions may result in the stick position failing to accurately represent a position of the swashplate, unless or until the trim motor back-drives the pilot control device to match the swashplate position. Continuously driving the stick, especially at high frequency due to aircraft dynamics, however, may increase workload of the pilot trim system and may increase pilot fatigue by transferring transient motions of the swashplate to the pilot's hand and forcing the pilot's hand to follow the stick as the swashplate moves.

Accordingly, teachings of certain embodiments recognize capabilities to wash out cross-feeds over a short period of time such that a displacement-trim flight control device substantially reflects the position of the swashplate during steady-state flight, but does not reflect the position of the swashplate during short transient periods. For example, the trim motor may drive the stick in certain conditions (e.g., during auto-pilot controlled flight or establishing a new trim position), but the FCC may be configured to not command the trim motor to move the pilot control stick in response to application of the cross-feed. In some embodiments, the FCC may be configured to command the motor to move the pilot control stick based on positions of the swashplate during steady-state conditions, and may be configured to not command the motor to move the pilot control stick during transitory conditions.

The wash out time period may be less than about ten seconds (e.g., about 2-7 seconds). In some embodiments, a wash out time period begins when the cross-feed is first applied. In other embodiments, a wash out time period begins after the aircraft returns to steady-state. In some embodiments, the aircraft returns to a same steady-state condition as existing before the cross-feed was applied. In other embodiments, a new steady-state condition may be established after the cross-feed is applied.

Elements of cross-feed arrangement 900 may be implemented at least partially by one or more computer systems 10. All, some, or none of the components of cross-feed arrangement 900 may be located on or near an aircraft, such as rotorcraft 100.

Users 5 may access cross-feed arrangement 900 through computer systems 10. For example, in some embodiments, users 5 may provide flight control inputs that may be processed using a computer system 10. Users 5 may include any individual, group of individuals, entity, machine, or mechanism that interacts with computer systems 10. Examples of users 5 include, but are not limited to, a pilot, a copilot, a service person, an engineer, a technician, a contractor, an agent, an employee, or the like. Users 5 may be associated with an organization. An organization may include any social arrangement that pursues collective goals. One example of an organization is a business. A business is an organization designed to provide goods or services, or both, to consumers, governmental entities, or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although representatively illustrated embodiments depict one example of computer system 10 that may be used, other embodiments may utilize computers other than computer system 10. Additionally, other embodiments may employ multiple computer systems 10 or other computers networked together in one or more public or private computer networks, such as one or more networks 30.

Processors 12 represent devices operable to execute logic contained within a computer-readable medium. Examples of processor 12 include one or more microprocessors, one or more applications, or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, a keyboard, a display, a printer, or the like.

Network interfaces 16 may be operable to facilitate communication between computer system 10 and another element of a network, such as other computer systems 10. Network interfaces 16 may connect to any number or combination of wireline or wireless networks suitable for data transmission, including transmission of communications.

Memory 18 represents any suitable storage mechanism and may store any data for use by computer system 10. Memory 18 may comprise one or more tangible, computer-readable, or computer-executable storage medium.

In some embodiments, memory 18 stores logic 20. Logic facilitates operation of computer system 10. Logic 20 may include hardware, software, or other logic. Logic 20 may be encoded in one or more tangible, non-transitory media and may perform operations when executed by a computer. Logic 20 may include a computer program, software, computer executable instructions, or instructions capable of being executed by computer system 10.

Various communications between computers 10 or components of computers 10 may occur across a network, such as network 30. Network 30 may represent any number and combination of networks suitable for data transmission. Network 30 may, for example, communicate internet protocol packets, frame relay frames, asynchronous transfer mode cells, or other suitable data between network addresses. Although representatively illustrated embodiments show one network 30, other embodiments may include more or fewer networks. Not all elements comprising various network embodiments may communicate via a network. Representative aspects and implementations will appreciate that communications over a network is one example of a mechanism for communicating between parties, and that any suitable mechanism may be used.

FIG. 10 representatively illustrates a three-loop FCS 1000 according to an embodiment. Like the cross-feed arrangement 900 of FIG. 9, elements of three-loop FCS 1000 may be implemented at least partially by one or more computer systems 10. All, some, or none of the components of three-loop FCS 1000 may be located on or near an aircraft such as rotorcraft 100.

The three-loop FCS 1000 of FIG. 10 has a pilot input 1010, an outer loop 1020, a rate (middle) loop 1030, an inner loop 1040, a decoupler 1050, and aircraft equipment 1060. Examples of inner loop 1040 and decoupler 1050 may include, but are not limited to, cross-feed arrangement 900 and inner loop 950 of FIG. 9. Representative examples of aircraft equipment 1060 may include, but are not limited to, actuator position converter 960 and actuators 970 of FIG. 9.

In the example of FIG. 10, a three-loop design separates the inner stabilization and rate feedback loops from outer guidance and tracking loops. The control law structure primarily assigns the overall stabilization task to inner loop 1040. Next, middle loop 1030 provides rate augmentation. Outer loop 1020 focuses on guidance and tracking tasks. Since inner loop 1040 and rate loop 1030 provide most of the stabilization, less control effort is required at the outer loop level. As representatively illustrated in FIG. 10, a switch 1025 is provided to turn third-loop flight augmentation on and off.

In some embodiments, the inner loop and rate loop include a set of gains and filters applied to roll/pitch/yaw 3-axis rate gyro and acceleration feedback sensors. Both the inner loop and rate loop may stay active, independent of various outer loop hold modes. Outer loop 1020 may include cascaded layers of loops, including an attitude loop, a speed loop, a position loop, a vertical speed loop, an altitude loop, and a heading loop.

The sum of inner loop 1040, rate loop 1030, and outer loop 1020 are applied to decoupler 1050. Decoupler 1050 approximately decouples the 4-axes (pitch, roll, yaw, and vertical) such that, for example, the forward longitudinal stick input does not require the pilot to push the stick diagonally. Similarly, as collective pull increases torque and results in an increased anti-torque requirement, decoupler 1050 may provide both the necessary pedal and a portion of cyclic (e.g., if rotorcraft 100 has a canted tail rotor) to counter increased torque.

In accordance with a representative embodiment, decoupling of plural flight characteristics allows for a control-law-automated, -mediated, or at least -assisted change in heading corresponding to, e.g., a standard rate turn. A standard rate turn, or "rate one turn" (ROT), is defined as a 3° per second turn, which completes a 360° turn in 2 minutes. This is known as a 2-minute turn, or rate one (180°/min). Fast aircraft, or aircraft on certain precision approaches, may use a half standard rate (termed "rate half" in some countries), but the definition of standard rate generally does not change.

Standardized turn rates are employed in approaches and holding patterns to provide a reference for controllers and pilots so that each will know what the other is expecting. The pilot banks or yaws the aircraft such that an avionics indicator points to a mark appropriate for that aircraft and then uses a clock to time the turn. The pilot can roll out or disengage yaw at any desired point of the maneuver depending on length of time in the turn. During a constant-bank level turn, increasing airspeed decreases the rate of turn and increases the turn radius. Considerations for manual execution of a standard rate turn involve substantial additional workload for the pilot.

Figure 11:
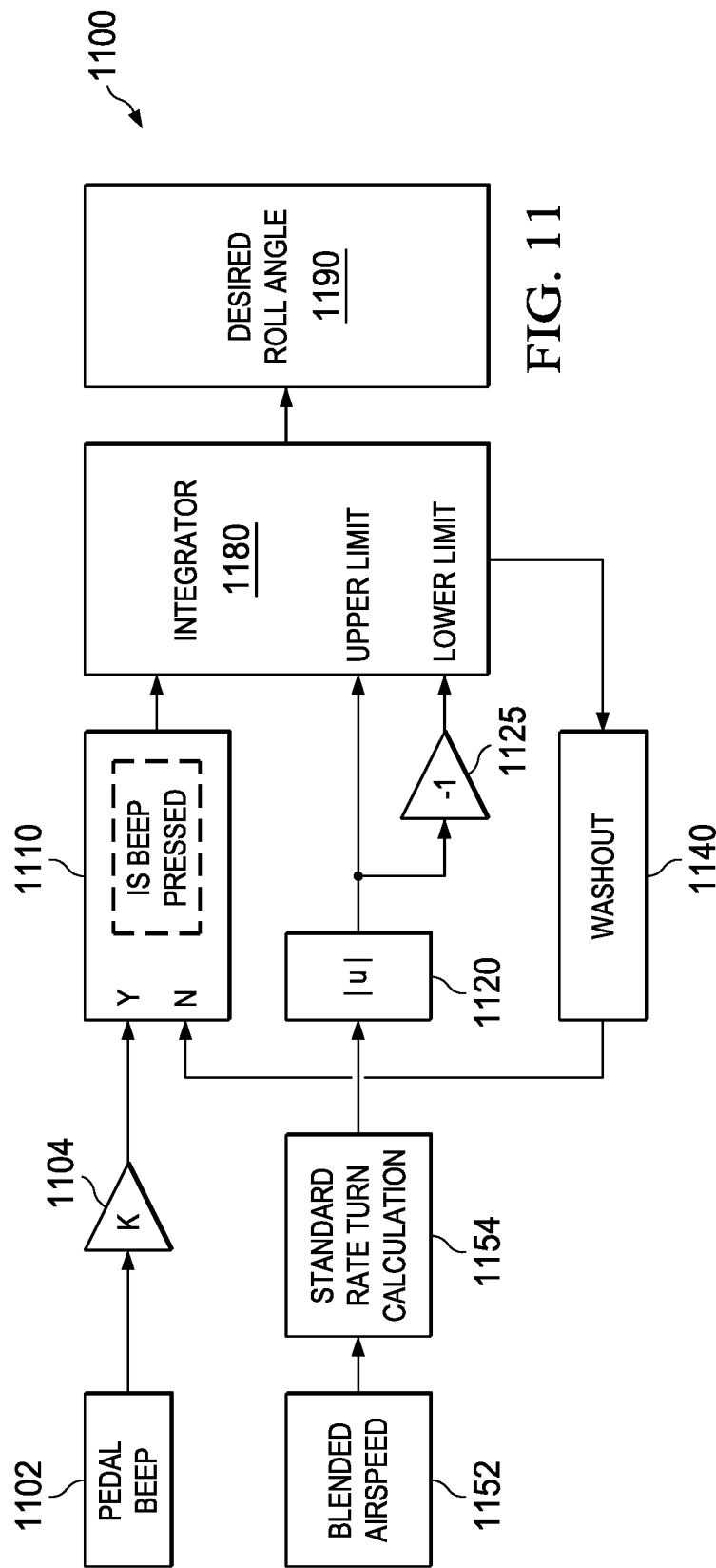
FIG. 11 representatively illustrates logic for determining a roll angle in accordance with an embodiment.

As representatively illustrated in FIG. 11, the FCC and FCS may be configured to engage a rated turn of rotorcraft 100 based on input received from the PCA in correspondence to a roll or banking maneuver (e.g., at speeds greater than about 35-40 knots). For example, the pilot may engage beep switch 402 to indicate that a left-hand standard rate turn is to be performed. In accordance with the preceding, the pilot slides beep switch 402 to a deflected position to the left of a neutral position of beep switch 402. Pilot manipulation of beep switch 402 produces pedal beep input 1102. Pedal beep input 1102 is processed through gain stage 1104 where "K" indicates a desired roll rate (e.g., 3° per second for a standard rate turn). Beep press detection logic 1110 determines if beep switch 402 is in a state of being manipulated by the pilot. If beep switch 402 is being manipulated, the desired roll rate (K) signal is accumulated by integrator 1180.

Integrator 1180 is configured with an upper limit and a lower limit. Roll angle |u| 1120 is computed from blended airspeed data 1152 and standard rate turn calculation 1154. It will be appreciated that various analytical or numerical solutions (or approximations) may be employed by standard rate turn calculation 1154 to obtain a roll angle |u| 1120 as a function of, or in correspondence to, blended airspeed data 1152. Blended airspeed data 1152 may comprise a composite value of airspeed and groundspeed as measured or otherwise determined from a plurality of sensors of rotorcraft 100. For example, groundspeed may be determined from differential global positioning satellite (GPS) data. As another example, airspeed may be determined as indicated airspeed ("IAS"), calibrated airspeed ("CAS"), true airspeed ("TAS"), equivalent airspeed ("EAS"), or density airspeed. In accordance with representative embodiments, any combination of groundspeed or airspeed sensor data may be used to provide a blended airspeed value.

Lower limit 1125 of integrator 1180 corresponds to a negative value of roll angle |u| 1120. That is to say that the upper limit corresponds to roll angle |u| 1120 (e.g., a first roll angle in a first direction) and lower limit corresponds to roll angle −|u| (e.g., a second roll angle equal in magnitude to roll angle |u| 1120, but in a second direction opposite the first direction). As long as beep switch 402 is manipulated, integrator will be supplied with signal from beep press detection logic 1110 which will be accumulated up to the upper limit to provide desired roll angle output 1190 for implementation by control laws to modify rotor system motions. However, when beep switch 402 is released or otherwise returned from a deflected position to a neutral position, wash out logic 1140 is configured to wash out integrator 1180 to bring rotorcraft 100 out of the banking or roll maneuver. In representative embodiments, a duration of wash out may be less than about 10 seconds, less than about 7 seconds, less than about 5 seconds, or less than about 2 seconds. In some embodiments, the duration of wash out may be a function of airspeed or blended airspeed of rotorcraft 100.

Figure 12:
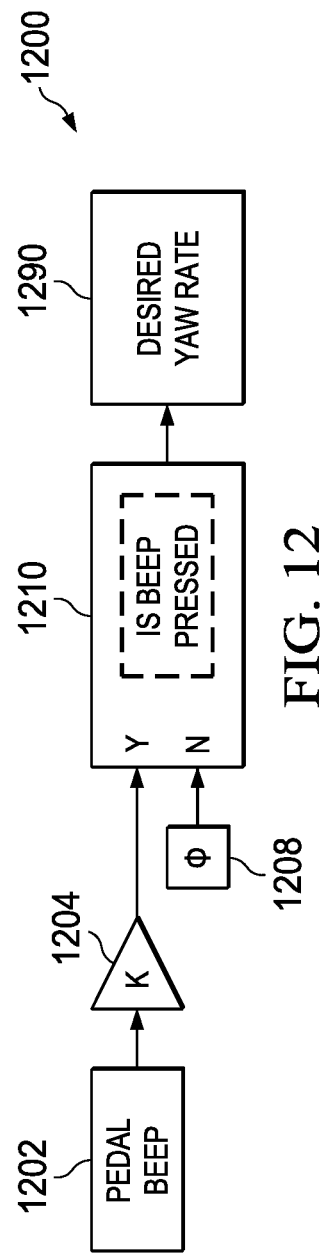
FIG. 12 representatively illustrates logic for determining a yaw rate in accordance with an embodiment.

As representatively illustrated in FIG. 12, the FCC and FCS may be configured to engage a rated turn of rotorcraft 100 based on input received from the PCA in correspondence to a yaw maneuver (e.g., at speeds less than about 35-40 knots). For example, the pilot may engage beep switch 402 to indicate that a right-hand standard rate turn is to be performed. In accordance with the preceding, the pilot slides beep switch 402 to a deflected position to the right of a neutral position of beep switch 402. Pilot manipulation of beep switch 402 produces pedal beep input 1202. Pedal beep input 1202 is processed through gain stage 1204 where "K" indicates a desired yaw rate. Beep press detection logic 1210 determines if beep switch 402 is in a state of being manipulated by the pilot. If beep switch 402 is being manipulated, the desired yaw rate (K) signal is provided as desired yaw rate output 1290 for implementation by control laws to modify rotor system motions. However, when beep switch 402 is released or otherwise returned from a deflected position to a neutral position, beep press detection logic 1210 is configured to set desired yaw rate output 1290 to a zero (o) value 1208 (e.g., terminating the yaw maneuver).

Figure 13:
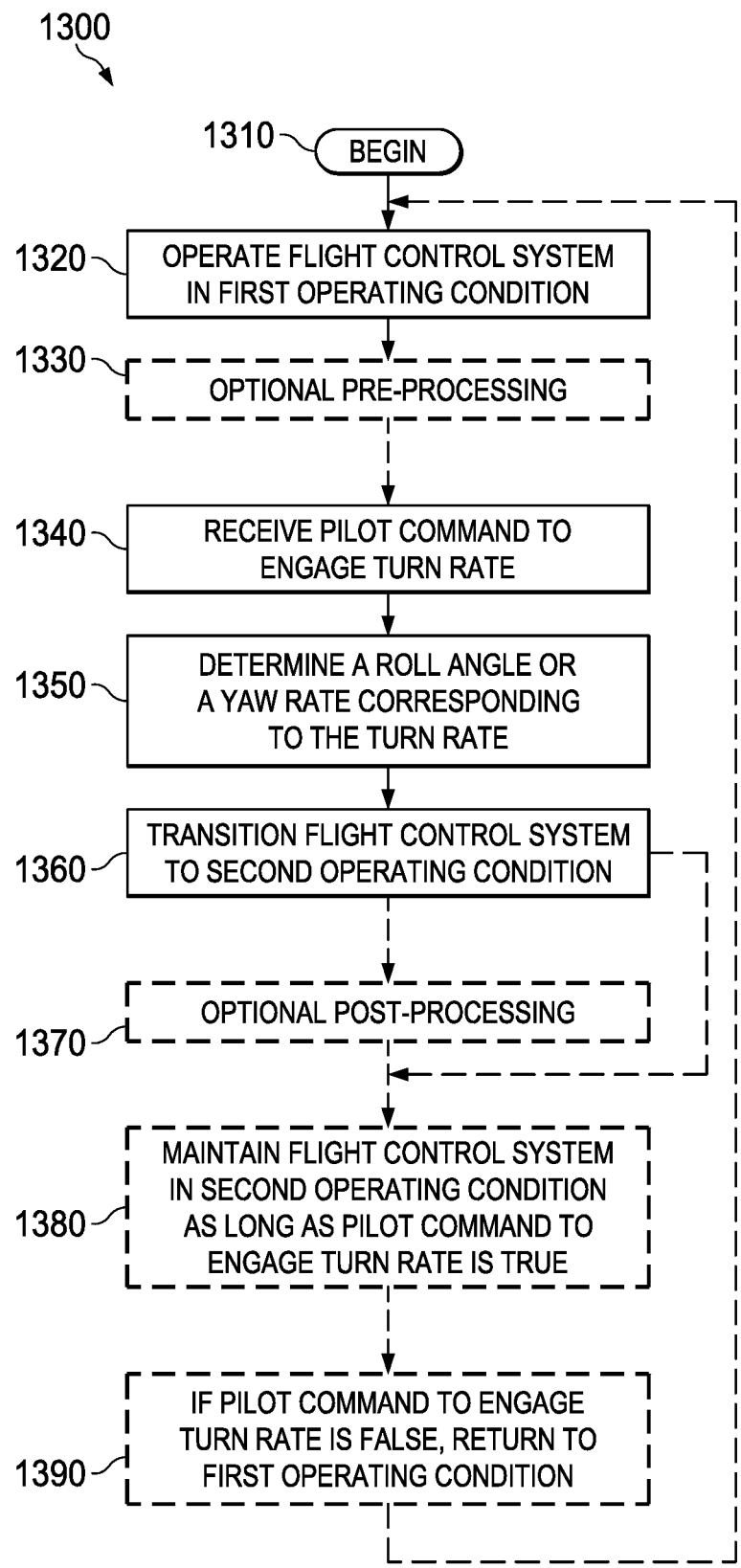
FIG. 13 representatively illustrates a fly-by-wire method for engaging a turn rate in accordance with an embodiment.

In accordance with an embodiment as representatively illustrated in FIG. 13, a method 1300 for implementing an automated, mediated, or assisted turn rate in control laws begins 1310 with a step 1320 of operating the FCS of rotorcraft 100 in a first operating condition. The first operating condition may be any condition of operating the FCS. For example, the first operating condition may correspond to rotorcraft 100 engaged in forward flight at relatively constant velocity on a relatively steady heading. Step 1330 represents optional pre-processing that the FCC may engage (or be engaged in) preliminary to the FCC receiving a pilot command to perform a turn rate in step 1340. For example, optional pre-processing 1330 may comprise control laws performing various transient adjustments during operation of rotorcraft 100 in the first operating condition 1320. After a pilot command is received in step 1340 to engage a turn rate, the FCC determines a roll angle or a yaw rate in step 1350 corresponding to the requested turn rate (e.g., a standard rate turn). Thereafter the FCS is transitioned to a second operating condition in step 1360—e.g., the second operating condition corresponding to banking/rolling of rotorcraft 100 at the roll angle or yawing rotorcraft 100 at the yaw rate. Thereafter, FCC may engage optional post-processing in step 1370. For example, optional post-processing 1370 may comprise control laws performing various automated adjustment in response to transient conditions to which rotorcraft 100 may be subject (e.g., wind gusts, or the like). Step 1380 determines whether the pilot is maintaining engagement of the requested turn rate (e.g., by continuing to hold beep switch 402 in a deflected position). As long as the pilot continues to request the turn rate, the FCS is maintained in the second operating condition. In step 1390, if the pilot releases or otherwise returns beep switch 402 from a deflected position to a neutral position, the FCS is returned to the first operating condition (e.g., constant velocity, steady heading).

Figure 14:
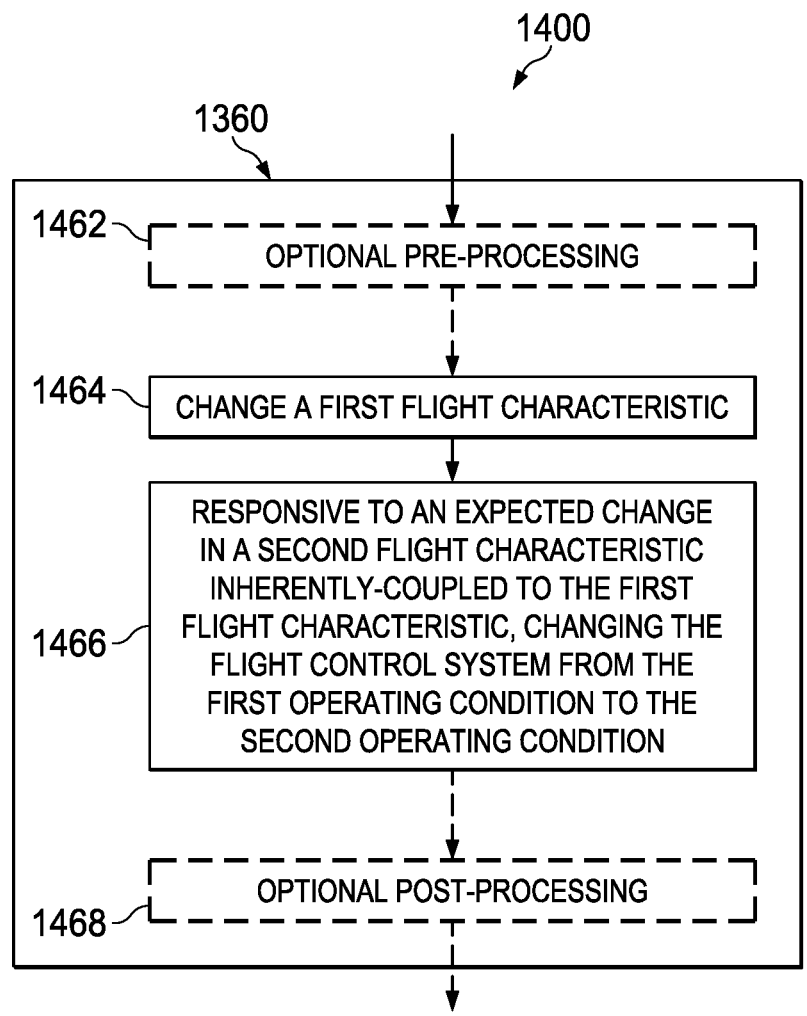
FIG. 14 representatively illustrates a fly-by-wire method for transitioning to a roll angle or a yaw rate in accordance with an embodiment.

In accordance with an embodiment as representatively illustrated in FIG. 14, step 1360 (see also FIG. 13) of transitioning the FCS to a second operating condition includes a step of optional pre-processing 1462. Optional pre-processing 1462 may include the same or similar, or different, elements as optional pre-processing step 1330 of FIG. 13. In step 1464, the FCC makes a change to a first flight characteristic. In step 1466, the FCC changes the first operating condition of the FCS to the second operating condition of the FCS in correspondence to, in congruence with, or otherwise appreciating, an expected change in a second flight characteristic inherently-coupled to, or convolved with, the first flight characteristic (as previously discussed) in order to counteract or otherwise address the expected change in the second flight characteristic (e.g., main rotor tilt engagement affecting a rolling maneuver may require modification of the collective). Thereafter optional post-processing may be performed in step 1468. Optional post-processing 1468 may identically include or find correspondence to same or similar, or different, elements as optional post-processing step 1370 of FIG. 13. That is to say, some or all of optional post-processing 1468 may be a subset of optional post-processing step 1370 of FIG. 13.

In an embodiment, a fly-by-wire (FBW) flight control system, includes a rotorcraft flight control computer (FCC) having a control law, the control law operable to engage a roll command or a yaw command in response to deflection of a beep switch of a pilot control assembly (PCA), wherein a roll angle for the roll command or a yaw rate for the yaw command is based on forward airspeed. The beep switch may be disposed on a collective control of the PCA. The control law may be further operable to disengage the roll command or the yaw command in response to the beep switch being returned from a deflected position to a neutral position. The roll angle or the yaw rate may correspond to a standard rate turn of about 3 degrees per second.

In another embodiment, a method includes the steps of: operating a rotorcraft in a first operating condition of a flight control system (FCS), the rotorcraft having a flight control computer (FCC) in electrical communication between the FCS and a pilot control assembly (PCA); the FCC receiving a pilot command to engage a turn rate based on movement of a beep switch of the PCA from a neutral position to a deflected position; and in response to the pilot command to engage the turn rate, the FCC transitioning to a second operating condition, wherein the second operating condition comprises one of a roll or a yaw in correspondence to the turn rate. The FCC transitioning to the second operating condition may comprise the steps of: changing a first flight characteristic, wherein changing the first flight characteristic would result in an expected change to a second flight characteristic, and wherein the first flight characteristic and the second flight characteristic have an inherently-coupled relationship; instructing the FCS to change the first operating condition of the FCS based on the inherently-coupled relationship; and in response to the expected change to the second flight characteristic, instructing the FCS to transition to the second operating condition of the FCS, wherein the second operating condition is operable to at least partially offset the expected change to the second flight characteristic such that the FCS is operable to at least partially decouple the inherently-coupled relationship of the first flight characteristic and the second flight characteristic. The beep switch may be disposed on a collective control of the PCA. A direction of the roll or the yaw may correspond to a direction of movement of the beep switch. The FCC may maintain the turn rate as long as deflection of the beep switch is held. The FCC may disengage the turn rate in response to the beep switch returning from the deflected position to the neutral position. The FCC may wash out transition to the second operating condition over a period of time in response to the beep switch returning from the deflected position to the neutral position. A duration of disengagement or wash out of the turn rate may be less than about 10 seconds. The turn rate may correspond to a standard rate turn of about 3 degrees per second. The FCC may determine at least one of a roll angle or a yaw rate, e.g., based on a forward airspeed of the rotorcraft. The forward airspeed may be determined from at least one sensor. The first operating condition may comprise a substantially steady-state heading of the rotorcraft prior to instructing the FCS to transition to the second operating condition. The second operating condition may further comprise a rolled state of the rotorcraft at the roll angle or yawing of the rotorcraft at the yaw rate.

In yet another embodiment, a rotorcraft comprises: a power train coupled to a body, the power train comprising a power source and a drive shaft coupled to the power source; a rotor system coupled to the power train and comprising a plurality of rotor blades; a flight control system (FCS) operable to change at least one operating condition of the rotor system; a pilot control assembly (PCA) configured to receive commands from a pilot, wherein the FCS is a fly-by-wire flight control system in electrical communication with the PCA; and a flight control computer (FCC) in electrical communication between the FCS and the PCA, the FCC configured to: receive, from a beep switch of the PCA, a pilot command to engage a turn rate; and in response to the pilot command to engage the turn rate, the FCC transitioning to a second operating condition of the rotor system, wherein the second operating condition of the rotor system comprises one of a roll or a yaw corresponding to the turn rate. The FCC may be further configured to: alter a first flight characteristic, wherein alteration of the first flight characteristic would result in an expected change to a second flight characteristic; in response to the pilot command to engage the turn rate, instruct the FCS to change a first operating condition of the rotor system based on an inherently-coupled relationship between the first flight characteristic and the second flight characteristic; and in response to the expected change to the second flight characteristic, instruct the FCS to transition to the second operating condition of the rotor system, wherein the second operating condition of the rotor system is operable to at least partially counter the expected change to the second flight characteristic such that the FCS is operable to at least partially decouple rotor system motions that are inherently coupled. The beep switch may be disposed on a collective control of the PCA. The pilot command to engage a turn rate may comprise a slide-to-side deflection of the beep switch away from a neutral position, and the FCC is further configured to maintain the turn rate as long as the slide-to-side deflection of the beep switch is maintained. The FCC may be further configured to disengage the turn rate in response to the pilot releasing the slide-to-side deflection and the beep switch returning to the neutral position. A duration of disengagement of the turn rate may be less than about 10 seconds. The turn rate may correspond to a standard rate turn of about 3 degrees per second. The FCC may be further configured to compute at least one of a roll angle or a yaw rate corresponding to the turn rate. The FCC may be further configured to compute the roll angle or the yaw rate based on forward airspeed of the rotorcraft. The FCC may be further configured to determine forward airspeed based on data received from at least one sensor. The first operating condition of the rotor system may comprise a substantially steady-state heading of the body prior to instructing the FCS to transition to the second operating condition of the rotor system. The second operating condition of the rotor system may comprise a rolled state of the body at the roll angle or yawing of the body at the yaw rate after instructing the FCS to transition to the second operating condition of the rotor system. The FCC may be configured to wash out transition to the second operating condition of the rotor system over a period of time in response to the beep switch returning from slide-to-side deflection to a neutral position. The PCA may comprise a pilot control stick and a motor configured to move the pilot control stick in response to commands from the FCC. The FCC may be configured to not command the motor to move the pilot control stick in response to instructing the FCS to transition to the second operating condition of the rotor system. The rotor system may comprise at least one of a main rotor system and a tail rotor system.

As used herein, the terms "comprises," "comprising," "includes," "including," "has," "having," or any contextual variant thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Furthermore, unless expressly stated to the contrary, "or" refers to an inclusive or and not an exclusive or. That is, the term "or" as used herein is generally intended to mean "and/or" unless otherwise indicated. For example, a condition "A or B" is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural connotations for such term, unless the context clearly indicates otherwise.

As used herein, the terms "measure," "measuring," "measurement," "determining," "determination," "detecting," "detection," "detector," "sensing," "sensor," or contextual variants thereof, refer to functions or device components that assign or otherwise provide an output value for at least one of a direct measurement, an in-direct measurement, or a computed measurement. For example, a determination or detection of an angle between two lines may comprise a direct measurement of the angle between the lines, an indirect measurement of the angle (e.g., as in the case of extending the length of two non-parallel lines outside the area of observation so as to predict their angle of intersection), or a computed measurement (e.g., using trigonometric functions to calculate an angle). Accordingly, "determining" the angle of intersection may be regarded as equivalent to "detecting" the angle of intersection, and a "detector" for determining the angle may be regarded as directly measuring, indirectly measuring, or computing the angle between the lines.

As previously discussed, representative embodiments of the disclosure may be implemented in a computer communicatively coupled to a network. The network may include, for example, a public network, a private network, the Internet, an intranet, an internet, a wide area network (WAN), a local area network (LAN), a storage area network (SAN), a personal area network (PAN), a metropolitan network (MAN), a satellite network, a public switched telephone network (PSTN), a cellular network, an optical network, a local network, a regional network, a global network, a wireless network, a wireline network, another computer, a standalone computer, or the like. As is known to those skilled in the art, a computer may include a central processing unit ("CPU") or processor, at least one read-only memory ("ROM"), at least one random access memory ("RAM"), at least one hard disc drive ("HDD"), and one or more input/output ("I/O") device(s). I/O devices may include a keyboard, monitor, printer, electronic pointing device (e.g., mouse, trackball, stylus, or the like, etc.), or the like. In various embodiments, a server computer may have access to at least one database over a network. The database may be local or remote to a server computer.

Additionally, representative functions may be implemented on one computer or shared, or otherwise distributed, among two or more computers in or across a network. Communications between computers may be accomplished using any electronic signals, optical signals, radio frequency signals, or other suitable methods or tools of communication in compliance with network protocols now known or otherwise hereafter derived. It will be understood for purposes of this disclosure that various flight control embodiments may comprise one or more computer processes, computing devices, or both, configured to perform one or more functions. One or more interfaces may be presented that can be utilized to access these functions. Such interfaces include application programming interfaces (APIs), interfaces presented for remote procedure calls, remote method invocation, or the like.

Any suitable programming language(s) can be used to implement the routines, methods, programs, or instructions of embodiments described herein, including; e.g., C, C#, C++, Java, Ruby, MATLAB, Simulink, assembly language, or the like. Different programming techniques may be employed, such as procedural or object oriented ontologies. Any particular routine can execute on a single computer processing device or multiple computer processing devices, a single computer processor, or multiple computer processors. Data may be stored in a single storage medium or distributed across multiple storage mediums, and may reside in a single database or multiple databases (or other data storage techniques).

Although steps, operations, or computations may be presented in a specific order, this order may be changed in different embodiments. In some embodiments, to the extent multiple steps are shown as sequential in the preceding description, some combination of such steps in alternative embodiments may be performed at a same time. The sequence of operations described herein may be interrupted, suspended, or otherwise controlled by another process, such as an operating system, kernel, daemon, or the like. The routines can operate in an operating system environment or as stand-alone routines. Functions, routines, methods, steps, or operations described herein can be performed in hardware, software, firmware, or any combination thereof.

Embodiments described herein may be implemented in the form of control logic in software or hardware, or a combination of both. Control logic may be stored in an information storage medium, such as a computer-readable medium, as a plurality of instructions adapted to direct an information processing device to perform a set of steps disclosed in various embodiments. Based on the disclosure and teachings provided herein, a person of ordinary skill in the art will appreciate other ways or methods to implement similar, or substantially similar, functionality.

It is also within the spirit and scope herein to implement, in software, programming, or other steps, operations, methods, routines, or portions thereof described herein, where such software programming or code can be stored in a computer-readable medium and can be operated on by a processor to permit a computer to perform any of the steps, operations, methods, routines, or portions thereof described herein. Embodiments may be implemented using software programming or code in one or more general purpose digital computers, by using, e.g., application specific integrated circuits (ASICs), programmable logic devices, field programmable gate arrays (FPGAs), or optical, quantum, or nano-engineered systems, components, or mechanisms. In general, functions disclosed herein may be achieved by any means, whether now known or hereafter derived in the art. For example, distributed or networked systems, components, or circuits can be used. In another example, communication or transfer (or otherwise moving from one place to another) of data may be wired, wireless, or accomplished by any other means.

A "computer-readable medium" may be any medium that can contain, store, communicate, propagate, or transport a program for use by or in connection with the instruction execution system, apparatus, system, or device. The computer-readable medium can be, but is not limited to, an electronic, magnetic, optical, electromagnetic, infrared, or semiconductor system, apparatus, system, device, propagation medium, or computer memory. Such computer-readable medium will generally be machine readable and include software programming or code susceptible to being human readable (e.g., source code) or machine readable (e.g., object code).

A "processor" includes any hardware system, mechanism or component that processes data, signals, or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," or the like. Portions of processing may be performed at different (or same) times and at different (or same) locations by different (or same) processing systems.

It will also be appreciated that one or more elements depicted in the Figures may also be implemented in a more-separated or more-integrated manner, or even removed or rendered inoperable in certain cases, as may be useful in accordance with particular applications and embodiments. Additionally, any signal lines or arrows in the Figures should be considered only as representative, and therefore not limiting, unless otherwise specifically noted.

Examples or illustrations provided herein are not to be regarded in any way as restrictions on, limits to, or express definitions of any term or terms with which they are associated. Instead, these examples or illustrations are to be regarded as being described with respect to a particular embodiment and as merely illustrative. Those skilled in the art will appreciate that any term or terms with which these examples or illustrations are associated will encompass other embodiments that may or may not be given therewith or elsewhere in the specification, and all such embodiments are intended to be included within the scope of that term or terms. Language designating such non-limiting examples and illustrations includes, but is not limited to: "for example," "for instance," "e.g.," "etc.," "or the like," "in a representative embodiment," "in one embodiment," "in another embodiment," or "in some embodiments." Reference throughout this specification to "one embodiment," "an embodiment," "a representative embodiment," "a particular embodiment," or "a specific embodiment," or contextually similar terminology, means that a particular feature, structure, property, or characteristic described in connection with the described embodiment is included in at least one embodiment, but may not necessarily be present in all embodiments. Thus, respective appearances of the phrases "in one embodiment," "in an embodiment," or "in a specific embodiment," or similar terminology in various places throughout the description are not necessarily referring to the same embodiment. Furthermore, particular features, structures, properties, or characteristics of any specific embodiment may be combined in any suitable manner with one or more other embodiments.

The scope of the present disclosure is not intended to be limited to the particular embodiments of any process, product, machine, article of manufacture, assembly, apparatus, means, methods, or steps herein described. As one skilled in the art will appreciate, various processes, products, machines, articles of manufacture, assemblies, apparatuses, means, methods, or steps, whether presently existing or later developed, that perform substantially the same function or achieve substantially the same result in correspondence to embodiments described herein, may be utilized according to their description herein. The appended claims are intended to include within their scope such processes, products, machines, articles of manufacture, assemblies, apparatuses, means, methods, or steps.

Benefits, other advantages, and solutions to problems have been described herein with regard to representative embodiments. However, any benefits, advantages, solutions to problems, or any component thereof that may cause any benefit, advantage, or solution to occur or to become more pronounced are not to be construed as critical, required, or essential features or components.

What is claimed is:

1. A fly-by-wire (FBW) flight control system, comprising:
a rotorcraft flight control computer (FCC) having a control law, the control law operable to engage a roll command or a yaw command in response to deflection of a beep switch of a pilot control assembly (PCA), wherein a roll angle for the roll command or a yaw rate for the yaw command is based on forward airspeed.

2. The FBW flight control system of claim 1, wherein the beep switch is disposed on a collective control of the PCA.

3. The FBW flight control system of claim 2, wherein the control law is further operable to disengage the roll command or the yaw command in response to the beep switch being returned from a deflected position to a neutral position.

4. The FBW flight control system of claim 1, wherein the roll angle or the yaw rate correspond to a standard rate turn of about 3 degrees per second.

5. A method, comprising:
operating a rotorcraft in a first operating condition of a flight control system (FCS), the rotorcraft having a flight control computer (FCC) in electrical communication between the FCS and a pilot control assembly (PCA);
the FCC receiving a pilot command to engage a turn rate based on movement of a beep switch of the PCA from a neutral position to a deflected position; and
determining forward airspeed of the rotorcraft; and
in response to the pilot command to engage the turn rate, the FCC transitioning to a second operating condition, wherein the second operating condition comprises one of a roll or a yaw in correspondence to the turn rate, wherein the second operating condition comprises changing yaw when the rotorcraft is operating in a first forward airspeed range and comprises changing roll when the rotorcraft is operating in a second forward airspeed range.

6. The method of claim 5, wherein the FCC transitioning to the second operating condition comprises:
changing a first flight characteristic, wherein changing the first flight characteristic would result in an expected change to a second flight characteristic, and wherein the first flight characteristic and the second flight characteristic have an inherently-coupled relationship;
instructing the FCS to change the first operating condition of the FCS based on the inherently-coupled relationship; and
in response to the expected change to the second flight characteristic, instructing the FCS to transition to the second operating condition of the FCS, wherein the second operating condition is operable to at least partially offset the expected change to the second flight characteristic such that the FCS is operable to at least partially decouple the inherently-coupled relationship of the first flight characteristic and the second flight characteristic.

7. The method of claim 6, wherein at least one of:
the beep switch is disposed on a collective control of the PCA;
a direction of the roll or the yaw corresponds to a direction of movement of the beep switch;
the FCC maintains the turn rate as long as deflection of the beep switch is held;
the FCC disengages the turn rate in response to the beep switch returning from the deflected position to the neutral position;
the FCC washes out transition to the second operating condition over a period of time in response to the beep switch returning from the deflected position to the neutral position;
a duration of disengagement or wash out of the turn rate is less than about 10 seconds;
the turn rate corresponds to a standard rate turn of about 3 degrees per second;
the FCC determines at least one of a roll angle or a yaw rate;
determination of at least one of the roll angle or the yaw rate is based on a forward airspeed of the rotorcraft;
the forward airspeed is determined from at least one sensor;
the first operating condition comprises a substantially steady-state heading of the rotorcraft prior to instructing the FCS to transition to the second operating condition; or
the second operating condition further comprises:
a rolled state of the rotorcraft at the roll angle; or
yawing of the rotorcraft at the yaw rate.

8. A rotorcraft, comprising:
a power train coupled to a body, the power train comprising a power source and a drive shaft coupled to the power source;
a rotor system coupled to the power train and comprising a plurality of rotor blades;
a flight control system (FCS) operable to change at least one operating condition of the rotor system;
a pilot control assembly (PCA) configured to receive commands from a pilot, wherein the FCS is a fly-by-wire flight control system in electrical communication with the PCA; and
a flight control computer (FCC) in electrical communication between the FCS and the PCA, the FCC configured to:
receive, from a beep switch of the PCA, a pilot command to engage a turn rate; and
in response to the pilot command to engage the turn rate, the FCC transitioning to a second operating condition of the rotor system, wherein the second operating condition of the rotor system comprises changing yaw when the rotorcraft is operating in a first forward airspeed range, and the second operating condition comprises changing roll when the rotorcraft is operating in a second forward airspeed range.

9. The rotorcraft of claim 8, wherein the FCC is further configured to:
alter a first flight characteristic, wherein alteration of the first flight characteristic would result in an expected change to a second flight characteristic;
in response to the pilot command to engage the turn rate, instruct the FCS to change a first operating condition of the rotor system based on an inherently-coupled relationship between the first flight characteristic and the second flight characteristic; and
in response to the expected change to the second flight characteristic, instruct the FCS to transition to the second operating condition of the rotor system, wherein the second operating condition of the rotor system is operable to at least partially counter the expected change to the second flight characteristic such that the FCS is operable to at least partially decouple rotor system motions that are inherently coupled.

10. The rotorcraft of claim 9, wherein the beep switch is disposed on a collective control of the PCA.

11. The rotorcraft of claim 10, wherein the pilot command to engage a turn rate comprises a slide-to-side deflection of the beep switch away from a neutral position, and the FCC is further configured to maintain the turn rate as long as the slide-to-side deflection of the beep switch is maintained.

12. The rotorcraft of claim 11, wherein the FCC is further configured to disengage the turn rate in response to the pilot releasing the slide-to-side deflection and the beep switch returning to the neutral position.

13. The rotorcraft of claim 12, wherein a duration of disengagement of the turn rate is less than about 10 seconds.

14. The rotorcraft of claim 13, wherein the turn rate corresponds to a standard rate turn of about 3 degrees per second.

15. The rotorcraft of claim 14, wherein the FCC is further configured to compute at least one of a roll angle or a yaw rate corresponding to the turn rate.

16. The rotorcraft of claim 15, wherein the FCC is further configured to compute the roll angle or the yaw rate based on forward airspeed of the rotorcraft.

17. The rotorcraft of claim 16, wherein the FCC is further configured to determine forward airspeed based on data received from at least one sensor.

18. The rotorcraft of claim 17, wherein:
the first operating condition of the rotor system comprises a substantially steady-state heading of the body prior to instructing the FCS to transition to the second operating condition of the rotor system;
the second operating condition of the rotor system comprises a rolled state of the body at the roll angle or yawing of the body at the yaw rate after instructing the FCS to transition to the second operating condition of the rotor system; and
the FCC is configured to wash out transition to the second operating condition of the rotor system over a period of time in response to the beep switch returning from slide-to-side deflection to a neutral position.

19. The rotorcraft of claim 8, wherein:
the PCA comprises a pilot control stick and a motor configured to move the pilot control stick in response to commands from the FCC; and
the FCC is configured to not command the motor to move the pilot control stick in response to instructing the FCS to transition to the second operating condition of the rotor system.

20. The rotorcraft of claim 8, wherein the rotor system comprises at least one of a main rotor system and a tail rotor system.

* * * * *